US012675148B2

(12) United States Patent
Lee et al.

(10) Patent No.: US 12,675,148 B2
(45) Date of Patent: *Jul. 7, 2026

(54) MOBILE DEVICE INCLUDING CONTEXT HUB AND OPERATION METHOD THEREOF

(71) Applicant: SAMSUNG ELECTRONICS CO., LTD., Suwon-si (KR)

(72) Inventors: Kyungsoo Lee, Yongin-si (KR); Taekkyun Shin, Kwangmyong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/622,663

(22) Filed: Mar. 29, 2024

(65) Prior Publication Data

US 2024/0241565 A1     Jul. 18, 2024

Related U.S. Application Data

(63) Continuation of application No. 17/536,778, filed on Nov. 29, 2021, now Pat. No. 11,971,769, which is a
(Continued)

(30) Foreign Application Priority Data

Feb. 9, 2018     (KR) ........................ 10-2018-0015993

(51) Int. Cl.
*G06F 1/00* (2006.01)
*G06F 1/324* (2019.01)
(Continued)

(52) U.S. Cl.
CPC ............ *G06F 1/324* (2013.01); *G06F 1/3293* (2013.01); *G06N 3/02* (2013.01); *G06N 3/08* (2013.01); *G06N 20/00* (2019.01)

(58) Field of Classification Search
CPC ................................ G06F 1/324; G06N 20/00
See application file for complete search history.

(56) References Cited

U.S. PATENT DOCUMENTS 5,986,549 A      11/1999  Teodorescu et al.
7,962,314 B2      6/2011  Chernoff
(Continued)

FOREIGN PATENT DOCUMENTS

CA          2225638 C       3/2004
CN         101952806        1/2011
(Continued)

OTHER PUBLICATIONS

Korean Examination Report dated Nov. 18, 2022, cited in corresponding Korean Application (with English translation).
(Continued)

*Primary Examiner* — Mohammed H Rehman
(74) *Attorney, Agent, or Firm* — Fish & Richardson P.C.

(57) ABSTRACT

A context hub receives and processes data from multiple sensors. An operation method of the context hub includes identifying a pattern of context data input to the context hub from at least one of the sensors, determining a dynamic voltage-frequency scaling (DVFS) level corresponding to the identified pattern of the context data, and processing, at the context hub, the context data by using a clock signal or a driving voltage corresponding to the determined DVFS level.

20 Claims, 14 Drawing Sheets

Related U.S. Application Data continuation of application No. 16/107,970, filed on Aug. 21, 2018, now Pat. No. 11,216,055.

(51) Int. Cl.

| | | |
|---|---|---|
| *G06F 1/3293* | (2019.01) | |
| *G06N 3/02* | (2006.01) | |
| *G06N 3/08* | (2023.01) | |
| *G06N 20/00* | (2019.01) | |

(56) References Cited

U.S. PATENT DOCUMENTS

| | | | |
|---|---|---|---|
| 8,364,857 | B2 | 1/2013 | Pyers et al. |
| 9,052,896 | B2 | 6/2015 | Schillings et al. |
| 9,329,701 | B2 | 5/2016 | Lautner et al. |
| 9,348,434 | B2 | 5/2016 | Koh et al. |
| 9,430,414 | B2 | 8/2016 | Trethewey |
| 9,442,556 | B2 | 9/2016 | Joo et al. |
| 9,632,520 | B2 | 4/2017 | Park et al. |
| 9,671,296 | B2 | 6/2017 | Niederberger et al. |
| 9,673,884 | B2 | 6/2017 | Kang et al. |
| 10,317,984 | B2 | 6/2019 | Kim et al. |
| 10,345,887 | B2 | 7/2019 | Hsiao et al. |
| 10,530,608 | B2 | 1/2020 | Iyengar |
| 11,194,376 | B2 | 12/2021 | Namgoong et al. |
| 11,971,769 | B2 * | 4/2024 | Lee ...................... G06F 1/3296 |
| 2006/0136763 | A1 | 6/2006 | Jorgenson et al. |
| 2008/0001095 | A1 * | 1/2008 | Astley ...................... G01T 1/17 |
| | | | 250/370.09 |
| 2010/0188328 | A1 | 7/2010 | Dodge et al. |
| 2011/0173617 | A1 | 7/2011 | Gargash et al. |
| 2012/0203511 | A1 | 8/2012 | DeVaul et al. |
| 2012/0212323 | A1 | 8/2012 | Skaaksrud et al. |
| 2012/0254878 | A1 | 10/2012 | Nachman et al. |
| 2014/0025208 | A1 | 1/2014 | Allen-Ware et al. |
| 2014/0068285 | A1 | 3/2014 | Lee et al. |
| 2014/0091624 | A1 | 4/2014 | Park et al. |
| 2014/0254433 | A1 * | 9/2014 | Abe ...................... H04L 45/48 |
| | | | 370/256 |
| 2014/0301259 | A1 | 10/2014 | Homchaudhuri et al. |
| 2015/0127300 | A1 | 5/2015 | Bluming et al. |
| 2015/0134982 | A1 | 5/2015 | Park et al. |
| 2015/0148981 | A1 * | 5/2015 | Kong ................. G05D 23/1917 |
| | | | 700/299 |
| 2015/0153807 | A1 | 6/2015 | Hao et al. |
| 2015/0215902 | A1 * | 7/2015 | Suga ...................... H04W 72/04 |
| | | | 455/450 |
| 2015/0282227 | A1 | 10/2015 | Yousef et al. |
| 2015/0287444 | A1 | 10/2015 | Lee et al. |
| 2016/0314095 | A1 | 10/2016 | Park et al. |
| 2016/0335534 | A1 | 11/2016 | Nere et al. |
| 2016/0370838 | A1 | 12/2016 | Gu et al. |
| 2017/0010664 | A1 | 1/2017 | Tanaka et al. |
| 2017/0147053 | A1 | 5/2017 | Chang et al. |
| 2017/0185457 | A1 | 6/2017 | Sun et al. |
| 2017/0205863 | A1 | 7/2017 | Lee et al. |
| 2017/0220445 | A1 | 8/2017 | Cunningham et al. |
| 2017/0269652 | A1 * | 9/2017 | Lee ...................... G06F 1/3287 |
| 2017/0282715 | A1 * | 10/2017 | Fung ...................... B60K 35/10 |
| 2017/0315747 | A1 | 11/2017 | Yang et al. |
| 2018/0047043 | A1 | 2/2018 | Bharadwaj et al. |
| 2018/0181183 | A1 | 6/2018 | Yoon et al. |
| 2019/0080487 | A1 | 3/2019 | Randall et al. |

FOREIGN PATENT DOCUMENTS

| | | |
|---|---|---|
| CN | 103576852 A | 2/2014 |
| CN | 103713676 A | 4/2014 |
| CN | 105706025 A | 6/2016 |
| CN | 105824393 A | 8/2016 |
| CN | 105867521 A | 8/2016 |
| GB | 201513348 | 2/2017 |
| KR | 20120104870 | 9/2012 |
| KR | 2014-0071221 | 6/2014 |
| KR | 20160089417 | 7/2016 |
| KR | 20180035364 | 4/2018 |
| TW | 201316252 | 4/2013 |
| TW | 201740243 | 11/2017 |
| WO | WO 2014153552 | 9/2014 |
| WO | WO 2017051269 A1 | 3/2017 |

OTHER PUBLICATIONS

Korean Notice of Allowance dated May 17, 2023, cited in corresponding Korean Patent Application (with English translation).

Examination Report dated Jun. 1, 2022, from Chinese Patent Office cited in Chinese Patent Application (with English translation), 36 pages.

\* cited by examiner

FIG. 3A

| Context Input Pattern(CIP) | DVFS level |
|---|---|
| CD1 | $f_0 + 2f_m$ |
| CD2 | $f_0 + f_m$ |
| CD3 | $f_0 - 2f_m$ |
| CD4 | $f_0 - f_m$ |
| CD1/CD2 | $f_0 + 3f_m$ |
| CD1/CD3 | $f_0 + 2f_m$ |
| CD1/CD4 | $f_0 + 2f_m$ |
| CD2/CD3 | $f_0 + 2f_m$ |
| CD2/CD4 | $f_0 + f_m$ |
| CD3/CD4 | $f_0$ |
| CD1/CD2/CD3 | $f_0 + 4f_m$ |
| CD1/CD2/CD4 | $f_0 + 3f_m$ |
| CD2/CD3/CD4 | $f_0 + 3f_m$ |
| CD1/CD2/CD3/CD4 | $f_0 + 5f_m$ |

FIG. 3B

| Context Input Pattern(CIP) | DVFS level | |
|---|---|---|
| CD1 | $f_0 + 2f_m$ | |
| CD2 | $f_0 + f_m$ | |
| CD3 | $f_0$ | |
| CD4 | $f_0 - f_m$ | |
| CD1/CDa | -- | Trigger Main Processor |
| CD1/CDb | $f_0 + 3f_m$ | |
| CD1/CDc | $f_0 + 2f_m$ | |
| CD2/CD3 | $f_0 + 2f_m$ | |
| CD2/CD4 | $f_0 + f_m$ | |
| CD3/CD4 | $f_0$ | |
| CD1/CDa/CDb | -- | Trigger Main Processor |
| CD1/CDa/CDc | -- | Trigger Main Processor |
| CD1/CD2/CDa | $f_0 + 3f_m$ | |
| CD1/CD2/CDa/CDb | -- | Trigger Main Processor |

FIG. 7

| Context Input Pattern(CIP) | DVFS level | |
|---|---|---|
| Image | $f_0 + 2f_m$ | |
| Touch | $f_0 + f_m$ | |
| Audio | $f_0 + 2f_m$ | |
| GNSS | $f_0$ | |
| Cellular | -- | Trigger Main Processor |
| NFC | -- | Trigger Main Processor |
| Accelerometer | $f_0 + 2f_m$ | |
| Proximity | $f_0 + 2f_m$ | |
| Humidity | $f_0 - 2f_m$ | |
| Gyrometer | $f_0$ | |
| HRM | $f_0$ | |
| Image + Audio | -- | Trigger Main Processor |
| Audio + Touch | -- | Trigger Main Processor |
| ⋮ | ⋮ | ⋮ |

FIG. 14

MOBILE DEVICE INCLUDING CONTEXT HUB AND OPERATION METHOD THEREOF

CROSS-REFERENCE TO RELATED APPLICATIONS

This application is a continuation of U.S. application Ser. No. 17/536,778, filed Nov. 29, 2021, which is a continuation of U.S. application Ser. No. 16/107,970, filed Aug. 21, 2018, now U.S. Pat. No. 11,216,055, and a claim of priority under 35 U.S.C. § 119 is made to Korean Patent Application No. 10-2018-0015993, filed on Feb. 9, 2018, in the Korean Intellectual Property Office, the disclosures of each are incorporated by reference herein in their entireties.

BACKGROUND

1. Technical Field

Embodiments of the present disclosure relate to an electronic device. More particularly, the present disclosure relates to a mobile device which includes a context hub that adjusts an operating frequency or a driving voltage depending on inputs from sensors, and an operation method thereof.

2. Description of the Related Art

Nowadays, in accordance with the trend of mobile convergence, mobile devices (e.g., a smartphone) include a gradually increasing type and/or number of sensors. A mobile device includes a sensor hub for processing data of sensors. In general, the mobile device is supplied with power from a battery. For this reason, when a user does not use the mobile device, an operation mode of an application processor (AP) may be switched to a sleep mode, thereby reducing unnecessary power consumption.

The mobile device needs to monitor an external state periodically by using at least one sensor module. In general, in the mobile device, context data which are received from one or more sensor modules may be processed by the sensor hub. As described herein, "context data" may be used as a term descriptive of several types of data. For example, context data may be descriptive of the context of the environment around the mobile device and the one or more sensor modules, including readings of environmental characteristics by the sensor modules. Context data may also or alternatively be processed data reflective of communications information received by a receiver (e.g., antenna) of a mobile device. Context data may also or alternatively be raw or processed data based on audio or visual information captured by a microphone or imaging component of a mobile device. Thus, context data may include a variety of types of data detected by, received by, captured by, or processed by, a sensor or other component of a mobile device. Pieces of context data provided from various sensor modules may be different from each other in importance or size and in required speed. Nevertheless, the sensor hub operates at a given speed regardless of attributes or importance of sensor modules and the size of context data. In addition, as the number of sensors of the mobile device sharply increases, the demand on improvement of power efficiency of the sensor hub is increasing.

SUMMARY

Embodiments of the present disclosure provide for reducing power consumption of a sensor hub or a context hub even though the number of sensors increases, and an operation method thereof.

According to an exemplary embodiment, a context hub receives and processes data from multiple (a plurality of) sensors. An operation method of the context hub includes identifying a pattern of context data input to the context hub from at least one of the sensors, determining a dynamic voltage-frequency scaling (DVFS) level corresponding to the identified pattern of the context data, and processing, at the context hub, the context data by using a clock signal or a driving voltage corresponding to the determined DVFS level.

According to an exemplary embodiment, a mobile device includes multiple sensors, a context hub, a main processor, a dynamic voltage-frequency scaling (DVFS) block, and a context input pattern information block. The context hub receives and processes context inputs provided from the sensors. The main processor wakes up from a sleep mode to an active mode based on the context hub. The DVFS block controls a frequency of a clock signal to be provided to the context hub or a level of a driving voltage to be provided to the context hub under control of the context hub. The context input pattern information block provides a DVFS level corresponding to a pattern of the context inputs. The context hub determines the DVFS level corresponding to the context inputs with reference to the context input pattern information block.

According to an exemplary embodiment, a context hub processes data provided by multiple sensors mounted on a mobile device. An operation method of the context hub includes identifying a context input pattern of context data input to the context hub from at least one of the sensors, processing the context data depending on a dynamic voltage-frequency scaling (DVFS) level corresponding to the identified context input pattern, and learning the DVFS level corresponding to the context input pattern depending on machine learning.

BRIEF DESCRIPTION OF THE FIGURES

The above and other objects and features of the present disclosure will become apparent by describing in detail exemplary embodiments thereof with reference to the accompanying drawings.

FIGS. 3A and 3B are tables illustrating a DVFS level corresponding to a context input pattern defined in a context input pattern information block.

FIG. 7 is a table illustrating a DVFS level corresponding to a context input pattern defined in a context input pattern information block of FIG. 5.

FIG. 14 is a block diagram illustrating an electronic device according to an embodiment of the present disclosure.

DETAILED DESCRIPTION

Below, embodiments of the present disclosure will be described in detail with reference to the attached drawings to the extent that the embodiments of the present disclosure are easily implemented by a person of ordinary skill in the art to which the inventive concept(s) described herein belong. Below, in the specification, a "context input" (CI) includes data primarily processed by a sensor interface or the like as well as raw data provided from a sensor. The context of the context input can be used to enhance and even optimize performance of an electronic device as described herein.

Figure 1:
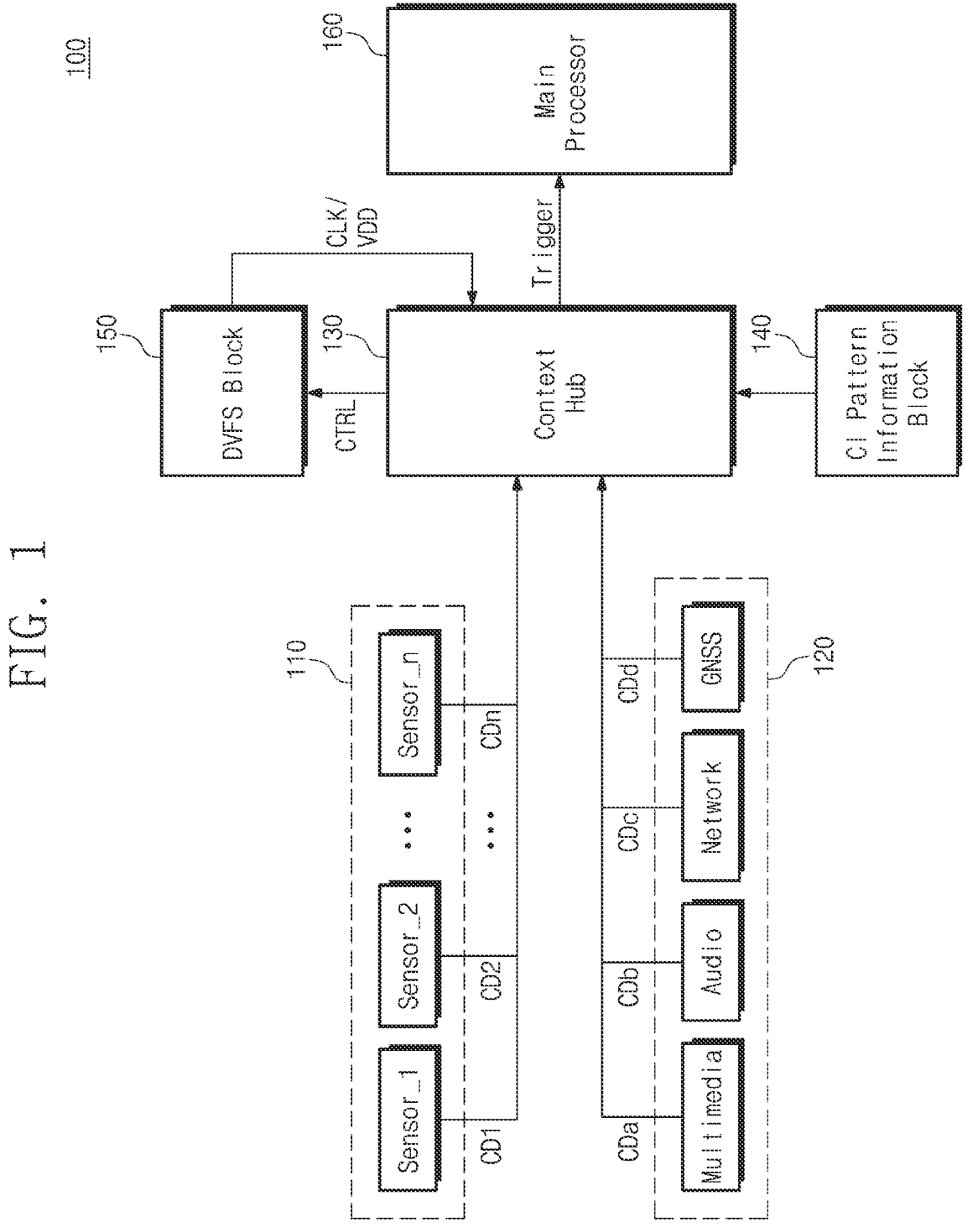
FIG. 1 is a block diagram illustrating an electronic device according to an embodiment of the present disclosure.

FIG. 1 is a block diagram illustrating an electronic device according to an embodiment of the present disclosure. Referring to FIG. 1, an electronic device 100 includes a sensor unit 110, a context unit 120, a context hub 130, a context input pattern information block 140, a dynamic voltage-frequency scaling (hereinafter referred to as "DVFS") block 150, and a main processor 160.

In FIGS. herein including FIG. 1, circuitry may be shown as, for example, a "hub", a "block", and a "unit". As is traditional in the field of the inventive concept(s) described herein, examples may be described and illustrated in terms of blocks which carry out a described function or functions. These blocks, which may be referred to herein as hubs, blocks, units, modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the examples may be physically separated into two or more interacting and discrete blocks without departing from the scope of the inventive concepts. Likewise, the blocks of the examples may be physically combined into more complex blocks without departing from the scope of the inventive concepts.

Additionally, a main processor 160 and any other processor described herein is tangible and non-transitory. As used herein, the term "non-transitory" is to be interpreted not as an eternal characteristic of a state, but as a characteristic of a state that will last for a period. The term "non-transitory" specifically disavows fleeting characteristics such as characteristics of a carrier wave or signal or other forms that exist only transitorily in any place at any time. A main processor 160 is an article of manufacture and/or a machine component. A main processor 160 is configured to execute software instructions to perform functions as described in the various embodiments herein. A main processor 160 may be a general-purpose processor or may be part of an application specific integrated circuit (ASIC). A main processor 160 may also be a microprocessor, a microcomputer, a processor chip, a controller, a microcontroller, a digital signal processor (DSP), a state machine, or a programmable logic device. A main processor 160 may also be a logical circuit, including a programmable gate array (PGA) such as a field programmable gate array (FPGA), or another type of circuit that includes discrete gate and/or transistor logic. Additionally, any main processor 160 described herein may include multiple processors, parallel processors, or both. Multiple processors may be included in, or coupled to, a single device or multiple devices.

The sensor unit 110 includes multiple sensors Sensor_1 to Sensor_n. Each of the sensors Sensor_1 to Sensor_n may sense various physical or chemical changes and may convert the sensed result to an electrical signal. For example, any one of the sensors Sensor_1 to Sensor_n may sense a change of a resistor "R" or a capacitor "C", the value of which varies with a physical or chemical change such as a temperature change, a humidity change, a change of the intensity of electrical field or magnetic field, or a change of the amount of light, and may change the sensed result to an electrical signal. Each of the sensors Sensor_1 to Sensor_n may include an analog-to-digital converter ADC that converts an electrical signal of an analog form to a digital signal. The sensors Sensor_1 to Sensor_n may process the digital signals converted by the analog-to-digital converters ADC through dedicated interfaces or processors, and may provide the processed results as context data CD1 to CDn. Here, it may be well understood that the context data CD1 to CDn are raw data such as analog signals or digital signals or data primarily processed by the dedicated interfaces or processors. It may be understood that a configuration or a function of each of the sensors Sensor_1 to Sensor_n is not limited to this disclosure. That is, each of the sensors Sensor_1 to Sensor_n may include any sensors that sense various physical, chemical changes and provide the sensed information to the context hub 130.

The context unit 120 may include a multimedia module, an audio module, a network module, and a global navigation satellite system (GNSS) module for the purpose of monitoring or processing various wired/wireless inputs or voice inputs/outputs provided in the electronic device 100. The multimedia module (e.g., a camera) may detect a multimedia input signal and may transmit context data CDa to the context hub 130 as the detection result. The audio module may sense or detect a voice input, may generate context data CDb as the detection result, and may transmit the context data CDb to the context hub 130. The network module may monitor a wired or wireless network signal, may generate context data CDc as the monitoring result, and may transmit the context data CDc to the context hub 130. The GNSS module may receive and process a satellite signal of the global navigation satellite system GNSS, may generate context data CDd as the processed result, and may transmit the context data CDd to the context hub 130.

Dynamic frequency scaling involves dynamically adjusting the frequency of a microprocessor based on actual conditions to conserve power and reduce levels of heat being generated. Dynamic voltage scaling is different than dynamic frequency scaling, and involves dynamically increasing or decreasing the voltage used in a component based on actual circumstances. Dynamic voltage-frequency scaling (DVFS) as described herein provides different frequency and/or voltage levels or modes depending input context data received at a context hub from sensors.

The context hub 130 may include a processor in a form described above, such as a microprocessor or an ASIC. The context hub may receive and process the context data CD1 to CDn from the sensors Sensor_1 to Sensor_n included in the sensor unit 110 and the context data CDa to CDd from the context unit 120. The context hub 130 may receive the context data CD1 to CDn periodically or randomly without intervention of the main processor 160. The context hub 130 of the present disclosure may operate at various DVFS levels or modes depending on types (kinds) of the input context data CD1 to CDn and CDa to CDd or a combination of the input context data CD1 to CDn and CDa to CD. Below, the types or combinations of the input context data CD1 to CDn and CDa to CDd are referred to as a "context input pattern CIP".

Types and/or combinations of input context data may vary in terms of the type of source of the input context data, a characteristic measured by a source of the input context data, a relative importance of the input context data, a size of the input context data, a required processing speed for the input context data, and other aspects described herein. Examples of input context data may include raw or processed data from a sensor, and may vary based on, for example, a type of source of the input context, a type of communication mechanism by which the input context data is received and/or a format of the input context data. A type of input context data may therefore also be particular to one or a subset (i.e., but not all) of the different sensors described herein. A combination of input context data may refer, for example, to a combination of input context data from different sensors, different sources, different types of communication mechanisms, and/or different formats. As an example, the type or combination of input context data may reflect the relative urgency to process the input context data. For example, speech data may require faster processing than text data or image data. As another example, audio and video data received simultaneously by two different sensors may require faster processing than only audio data received by one sensor.

That is, the context hub 130 may adjust a frequency of a clock signal CLK and/or a level of a driving voltage VDD depending on the context input pattern CIP. Here, the context hub 130 identifies the context input pattern CIP of currently input context data CD1 to CDn and CDa to CDd and compares the identified context input pattern CIP with information stored in the context input pattern information block 140. Depending on a result of the comparison, the context hub 130 may control the DVFS block 150 such that the frequency of the clock signal CLK and/or the level of the driving voltage VDD is controlled (or adjusted).

For example, when context data requiring a small computational burden is provided, the context hub 130 may be controlled to be driven with the clock signal CLK of a low frequency or the driving voltage VDD of a low level. Even in the case where the main processor 160 is in a sleep-mode state, the context hub 130 may control context data CDi (i being a natural number of 1 or more) from the sensor unit 110 with a low power. Also, it may be well understood that the context hub 130 may individually control at least one of the sensors Sensor_1 to Sensor_n.

The context input pattern information block 140 defines a DVFS level associated with the context input pattern CIP of the context data CD1 to CDn input to the context hub 130. A frequency of the clock signal CLK and/or a level of the driving voltage VDD may be optimized with regard to (e.g., based on) the context input pattern CIP of the context data CD1 to CDn, and may be stored in the context input pattern information block 140. The DVFS level may be optimized with regard to (e.g., based on) the context input pattern CIP of the context data CD1 to CDn stored in the context input pattern information block 140, and may be provided as a value obtained through a simulation or various tests.

The DVFS block 150 may generate the driving voltage VDD and the clock signal CLK which are used to drive the context hub 130. For example, the DVFS block 150 may include clock generating circuits or a power circuit that generates a driving voltage to be provided to the context hub 130. The DVFS block 150 may change a frequency of the clock signal CLK and/or a level of the driving voltage VDD under control of the context hub 130. As illustrated in FIG. 1, the clock signal CLK and the driving voltage VDD may be provided to the context hub 130. The DVFS block 150 may change a frequency of the clock signal CLK and/or a level of the driving voltage VDD in response to a control signal CTRL which is generated according to the context input pattern CIP of the context data CD1 to CDn input to the context hub 130.

The main processor 160 may be a processor which controls the electronic device 100. The main processor 160 may perform data processing or an operation associated with a control and/or a communication of at least one other component(s) of the electronic device 100. The main processor 160 may include one or more of a central processing unit (CPU), an application processor (AP), and a communication processor (CP).

The main processor 160 may operate in an active mode and a sleep mode. For example, in the sleep mode, the main processor 160 is maintained in a state where overall operations for controlling the electronic device 100 or executing an application program are stopped. In contrast, when the main processor 160 is triggered by the context hub 130, the main processor 160 wakes up, that is, switches from the sleep mode to the active mode. Afterwards, the main processor 160 may perform an operation for processing context data dumped from the context hub 130. In the present disclosure, it is assumed that the main processor 160 is in a sleep-mode state as a default state.

Configurations and features of the electronic device 100 are briefly described above. The electronic device 100 includes the context hub 130. A frequency of the clock signal CLK and/or a level of the driving voltage VDD is adjusted in the context hub 130 according to the context input pattern CIP of the context data CD1 to CDn or CDa to CDd provided from the sensor unit 110 or the context unit 120. Accordingly, power needed to sense or monitor an ambient environment or state in the sleep mode of the electronic device 100 or the main processor 160 may be minimized. Insofar as a demand for more sensors is imposed increasingly on a mobile device, power management of the context hub 130 becomes more important since the context hub 130 collects and manages context data of the sensors. Accordingly, the inventive concept(s) described herein are expected to provide innovative power efficiency as a power management solution of the electronic device 100.

Figure 2:
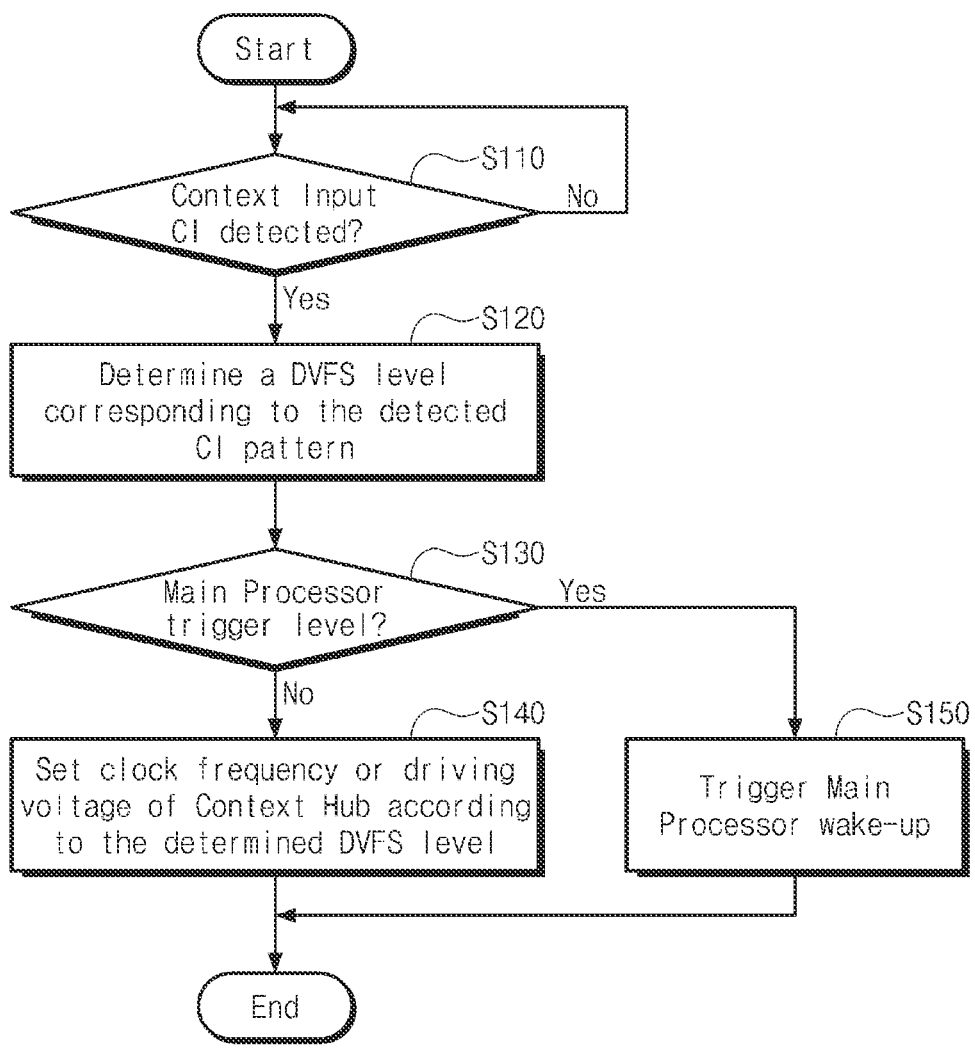
FIG. 2 is a flowchart illustrating an operation of a context hub of FIG. 1.

FIG. 2 is a flowchart illustrating an operation of a context hub of FIG. 1. Referring to FIG. 2, the context hub 130 may control a DVFS level of the context hub 130 depending on the context input pattern CIP of context data provided from the sensors Sensor_1 to Sensor_n or the context unit 120.

In operation S110, the context hub 130 monitors whether a context input CI from the sensor unit 110 or the context unit 120 exists. In the case where the context input CI exists (S110=Yes), the procedure proceeds to operation S120. In contrast, in the case where the context input CI does not exist (S110=No), the context hub 130 continues a monitoring operation for detecting whether the context input CI exists.

In operation S120, the context hub 130 determines the DVFS level depending on the received context input CI. That is, the context hub 130 identifies a type, a combination, or a pattern of the received context input CI to detect a DVFS level stored in the context input pattern information block 140. In the case where the context input CI provided to the context hub 130 corresponds to one context data CD1, the context hub 130 may be provided with a DVFS level corresponding to the case that only one context data CD1 is received, from the context input pattern information block 140. Thus, a determined dynamic voltage-frequency scaling level corresponding to a received context input CI may be identified by the context hub 130.

In operation S130, the context hub 130 determines whether the context input CI corresponds to data that the main processor 160 should process. For example, the case where the context input CI corresponds to a call signal of a communication processor included in a network module may be considered as the case of waking up the electronic device 100. In the case where the context input CI does not correspond to data that the main processor 160 should process (S130=No), the procedure proceeds to operation S140. In the case where the context input CI corresponds to data that the main processor 160 should process (S130=Yes), the procedure proceeds to operation S150.

In operation S140, the context hub 130 may set the DVFS block 150 with a DVFS level corresponding to a sensor input. As such, the DVFS block 150 may generate the clock signal CLK of a set frequency and/or the driving voltage VDD of a set level and may provide the clock signal CLK and/or the driving voltage VDD to the context hub 130.

In operation S150, the context hub 130 may trigger the main processor 160 to wake up for the purpose of processing context data corresponding to the context input CI. In this case, the context hub 130 may dump context data on a working memory of the main processor 160. The context data dumped on a working memory of the main processor 160 may have already been partially or primarily processed by a sensor interface or another element before the main processor 160.

How a DVFS level is determined according to the context input pattern CIP input to the context hub 130 of the present disclosure is briefly described above. Here, it may be well understood that the context input pattern CIP may be information about a type or a combination of context data input to the context hub 130.

FIGS. 3A and 3B are tables illustrating a DVFS level corresponding to a context input pattern defined in a context input pattern information block 140. FIG. 3A shows an example of context input pattern information in which a wake-up level of the main processor 160 is not considered, and FIG. 3B shows an example of context input pattern information in which a wake-up level of the main processor 160 is considered. Here, the DVFS level will be mentioned only in consideration of a frequency of the clock signal CLK. However, it may be well understood that a level of the driving voltage VDD is also adjusted together with, or alternative to, a frequency. In addition, a description will be given under assumption that the number of context data is 4 (e.g., CD1, CD2, CD3, and CD4). However, this is only one exemplification for convenience of description. It may be well understood that more context data are input from more sensors or components.

Referring to FIG. 3A, the context input pattern information block 140 may define a DVFS level depending on a pattern of context data provided from the sensor unit 110 periodically or at any time point such as when needed or requested. For example, in the case where the context input CI detected by the context hub 130 corresponds to the context data CD1 provided from the sensor Sensor_1, the corresponding DVFS level may be defined to be "$f_0+2f_m$". That is, the context data CD1 may be, for example, data, which should be processed at a relatively high speed, such as a voice input. Alternatively, in the case where the context input CI detected by the context hub 130 corresponds to the context data CD3 provided from the sensor Sensor_3, the corresponding DVFS level may be defined to be "$f_0-2f_m$". That is, the context data CD3 may be data of a sensor, which may be processed at a relatively low speed. Thus, an identified pattern of context data may correspond to a dynamic voltage-frequency scaling level (DVFS level) as defined in the context input pattern information block 140.

In the case where the context input pattern CIP detected by the context hub 130 corresponds to a pattern (CD1+CD2) of context data provided from the sensors Sensor_1 and Sensor_2, the corresponding DVFS level may be defined to be "$f_0+3f_m$". That is, a combination of the context data CD1 and CD2 may correspond to data which should be processed at a high speed. As such, the context hub 130 of the present disclosure may operate depending on an optimum DVFS level with regard to various combinations of context data (or various context input patterns CIP).

Referring to FIG. 3B, the context input pattern information block 140 may define a DVFS level depending on a type or combination of context data provided from the sensor unit 110 or the context unit 120 periodically or at any time point such as when needed or requested. In addition, in the case of a specific context input pattern CIP, the context hub 130 may trigger a wake-up of the main processor 160.

For example, in the case where the context input CI detected by the context hub 130 corresponds to the context data CD1 provided from the sensor Sensor_1, the corresponding to DVFS level may be "$f_0+2f_m$". Alternatively, in the case where the context input CI detected by the context hub 130 corresponds to the context data CD3 provided from the sensor Sensor_3, the corresponding DVFS level may be "$f_0$". That is, the context data CD3 may be data of a sensor, which may be processed at a relatively low speed.

In particular, in the case where the context input pattern CIP detected by the context hub 130 corresponds to a combination of the context data CD1 and CDa provided from the sensor Sensor_1 and the multimedia module, the context hub 130 may be controlled to trigger the main processor 160 to wake up. Besides, for example, in the case where the context input pattern CIP detected corresponds to a combination of the context data CD1, CDa, and CDb provided from the sensor Sensor_1, the multimedia module, and the audio module, the context hub 130 may be controlled to trigger the main processor 160 to wake up.

As the DVFS level of the context hub 130 corresponding to each context input pattern CIP is optimally adjusted, power consumption of the electronic device 100 when the main processor 160 is in the sleep mode may be minimized.

Figure 4:
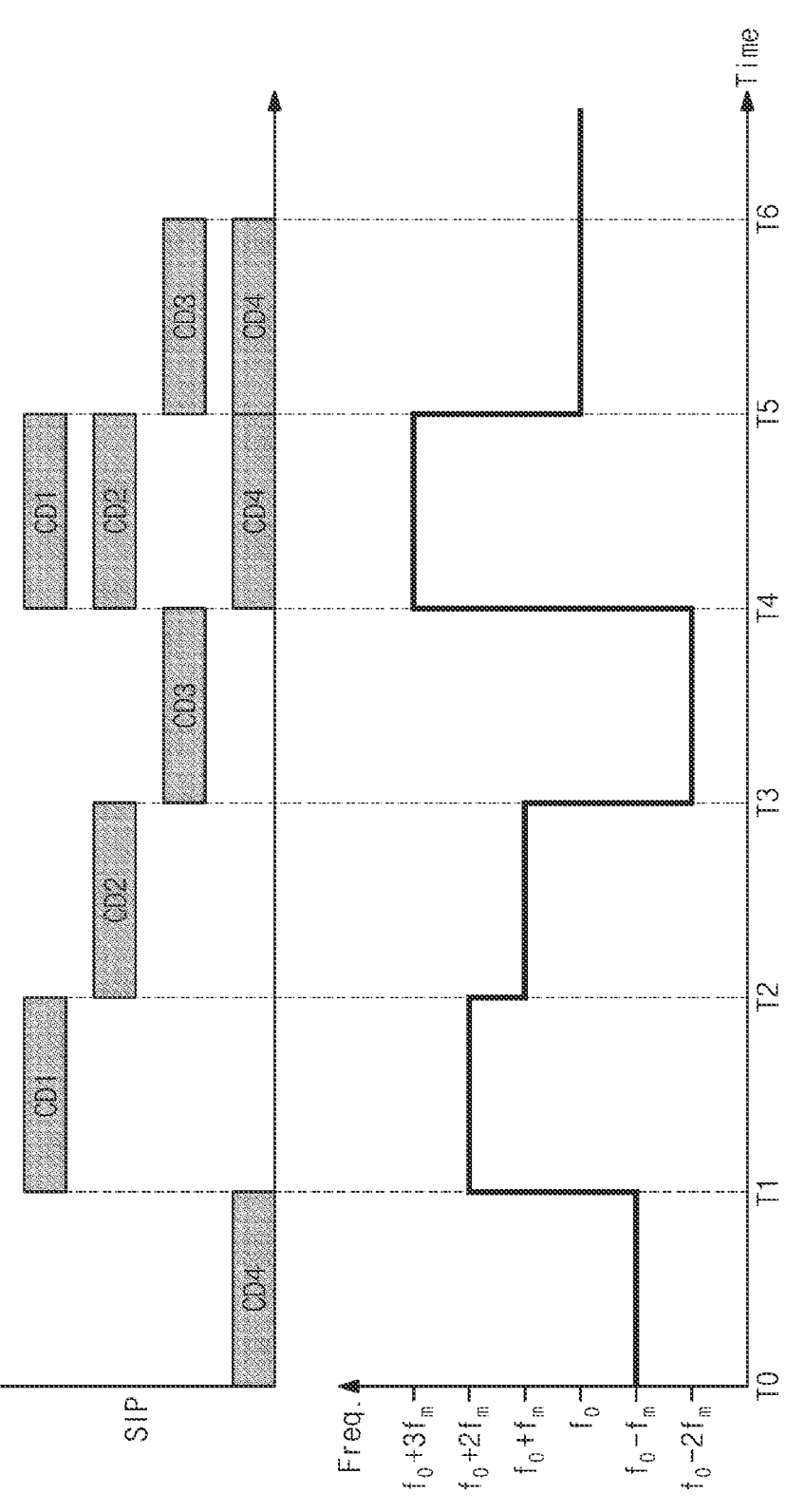
FIG. 4 is a timing diagram illustrating an operation characteristic of a context hub according to an embodiment of the present disclosure.

FIG. 4 is a timing diagram illustrating a characteristic of a context hub according to an embodiment of the present disclosure. Referring to FIG. 4, a frequency of the clock signal CLK of the context hub 130 (refer to FIG. 1) may be dynamically adjusted according to the context input pattern CIP. Here, a frequency of the clock signal CLK is illustrated as an example of the DVFS level, but a level of the driving voltage VDD may also (or alternatively) be changed together with (or instead of) the frequency of the clock signal CLK. It is assumed that a DVFS level corresponding to each context input pattern CIP follows the table of FIG. 3A.

At a time point T0, the context data CD4 are provided to the context hub 130. The context data CD4 may correspond to a context input CI which may be processed at a relatively low speed. Accordingly, in the case where the context data CD4 are input, the context hub 130 may set a frequency of the clock signal CLK to "$f_0-f_m$". As such, a frequency of the clock signal CLK which is provided from the DVFS block 150 to the context hub 130 is adjusted to "$f_0-f_m$". In this case, the driving voltage VDD, the level of which corresponds to the frequency "$f_0-f_m$" of the clock signal CLK, may be provided to the context hub 130.

At a time point T1, the context data CD1 are provided to the context hub 130. The context data CD1 may be considered as a context input CI which may be processed at a relatively high speed. Accordingly, in the case where the context data CD1 are input, the context hub 130 may set a frequency of the clock signal CLK to "$f_0+2f_m$".

At a time point T2, the context data CD2 are provided to the context hub 130. In the case where the context data CD2 correspond to a context input pattern CIP as a sole input, the context hub 130 may set a frequency of the clock signal CLK to "$f_0+f_m$". That is, the context hub 130 may process the context data CD2 in a state where a frequency of the clock signal CLK is lower (as shown) than at the previous time point.

At a time point T3, the context data CD3 are provided to the context hub 130. In the case where the context data CD3 correspond to a context input pattern CIP as a sole input, the context hub 130 may set a frequency of the clock signal CLK to "$f_0-2f_m$" corresponding to the lowest level of DVFS levels. That is, the context data CD3 are context data of an attribute which does not need fast processing. The context hub 130 may process the context data CD3 in a state where a frequency of the clock signal CLK is lower (as shown) than at the previous time points.

At a time point T4, the context data CD1, CD2, and CD4 are provided to the context hub 130. In the case of a context input pattern CIP corresponding to a combination of the context data CD1, CD2, and CD4, the context hub 130 may set a frequency of the clock signal CLK to "$f_0+3f_m$" corresponding to the highest level of DVFS levels. That is, to quickly process the context data CD1, CD2, and CD4, the context hub 130 may allow the DVFS block 150 to generate the clock signal CLK of the highest frequency and/or the driving voltage VDD of the highest level.

At a time point T5, the context data CD3 and CD4 are provided to the context hub 130 as a context input pattern CIP. In the case of a context input pattern CIP corresponding to a combination of the context data CD3 and CD4, the context hub 130 may control the DVFS block 150 such that a frequency of the clock signal CLK is set to "$f_0$". The context hub 130 may process the context data CD3 and CD4 under the condition that the clock signal CLK has the adjusted frequency "$f_0$" and the driving voltage VDD has a level corresponding to the adjusted frequency "$f_0$".

An example in which the DVFS level of the context hub 130 is changed according to the context input pattern CIP is described above. A frequency of the clock signal CLK is used as an example of the DVFS level of the context hub 130 which will be changed. However, it may be well understood that both a level of the driving voltage VDD and a frequency of the clock signal CLK can be used as an example of the DVFS level of the context hub 130 which will be changed. As the DVFS level is changed according to the context input pattern CIP, power consumption of the context hub 130 in the sleep mode of the electronic device 100 may be minimized. In addition, a latency which is needed to process context data at the context hub 130 may be minimized.

Figure 5:
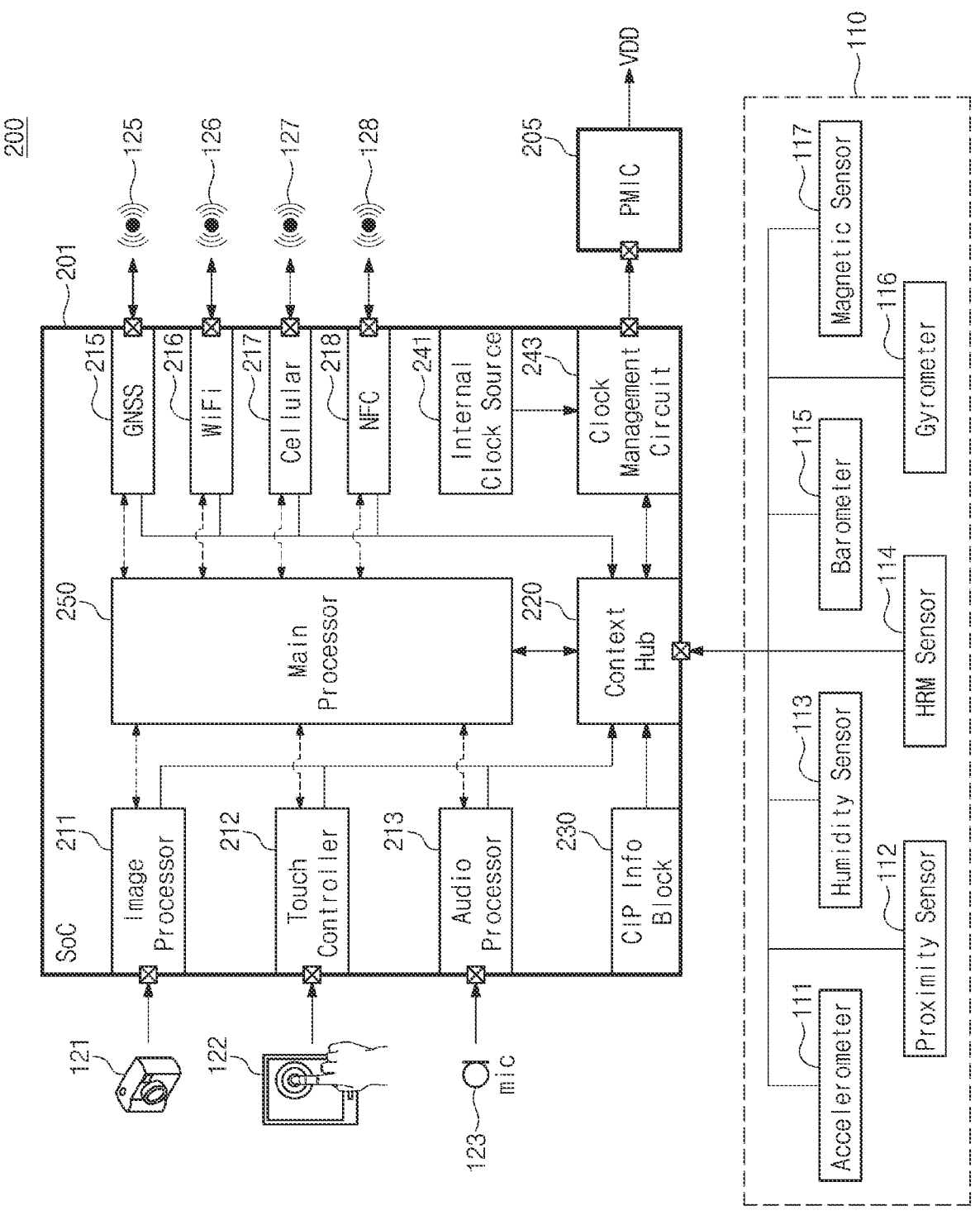
FIG. 5 is a block diagram illustrating a mobile device having a context hub according to an embodiment of the present disclosure.

FIG. 5 is a block diagram illustrating a mobile device having a context hub according to an embodiment of the present disclosure. Referring to FIG. 5, a mobile device 200 may include a system-on-chip 201, sensor unit 110, image sensor 121, touch pad 122, and microphone 123, wireless antennas 125, 126, 127, and 128, and a power management IC 205 (power management integrated circuit or (PMIC)).

A system-on-chip 201 may be one chip into which various (multiple different) systems are integrated, such as on a single integrated substrate and/or such as within an integrated housing. The system-on-chip 201 includes a context hub 220 which may change a DVFS level depending on a context input pattern CIP. The context hub 220 may include a processor in a form described above, such as a microprocessor or an ASIC. The system-on-chip 201 also includes a main processor 250. Accordingly, the context hub 220 and the main processor 250 are implemented on the same system-on-chip.

The sensor unit 110, image sensor 121, touch pad 122, and microphone 123 or the wireless antennas 125, 126, 127, and 128 provide sensed signals or received signals to the system-on-chip 201. Each of the sensor unit 110, image sensor 121, touch pad 122, and microphone 123 or the wireless antennas 125, 126, 127, and 128 may be implemented in the form of a module, a chip, or a device. An image sensor 121 captures an image such as a shape of a face of a user or a shape of an object and provides the captured image to an image processor 211 of the system-on-chip 201. The image processor 211 may convert an image signal of a raw data form to data of a processable form and may transmit the data to the context hub 220. The touch pad 122 senses a signal corresponding to a touch on a pad and provides the sensed signal to a touch controller 212 of the system-on-chip 201. The microphone 123 may convert an input voice signal to an electrical signal and may provide the electrical signal to an audio processor 213 of the system-on-chip 201.

The sensor unit 110 provides measured sensing signals to the context hub 220 of the system-on-chip 201. For example, an accelerometer 111 may measure an acceleration of the mobile device 200 and may transmit the measured result to the context hub 220 periodically or at a time point when an event occurs. The accelerometer 111 may measure, for example, an acceleration of each of three axes and may provide the measured result to the context hub 220. A proximity sensor 112 detects whether a target approaches the mobile device 200 within a given distance without contact. The proximity sensor 112 may be classified as a magnetic type that uses a change of a magnetic field, an optical type that uses an optical sensor, a capacitance type that detects a change of capacitance, etc. A humidity sensor 113 senses a humidity of a point where the mobile device 200 is located and provides the sensed result to the context hub 220. The humidity sensor 113 may sense a resistance or capacitance change as an electrical signal according to a humidity by using porous ceramic or polyelectrolyte material. Alternatively, the humidity sensor 113 may sense a humidity by sensing a change of a resonant frequency of a piezoelectric body according to a humidity.

A heart rate monitor 114 (HRM sensor) counts a heart rate and transmits the counted result to the context hub 220. A barometer 115 senses atmospheric pressure and transmits the measured result to the context hub 220. A gyrometer 116 is mounted on the mobile device 200 to measure an angular speed which varies when the mobile device 200 rotates or moves. Nowadays, the gyrometer 116 may be provided in the form of a chip to which a micro electro mechanical system (MEMS) technology is applied. A magnetic sensor 117 measures the magnitude and direction of a magnetic field or a line of magnetic force formed around the mobile device 200. The magnetic sensor 117 converts a change of the magnetic field of the line of magnetic force to an electrical signal and provides the electrical signal to the context hub 220.

Communication interfaces which use the wireless antennas 125, 126, 127, and 128 may include a GNSS interface 215, a WiFi interface 216, a cellular interface 217, and a NFC interface 218 (near field communication interface). The GNSS interface 215 processes a satellite signal of a global navigation satellite system (GNSS) received through the wireless antenna 125. The WiFi interface 216 may primarily process a wireless signal received through the wireless antenna 126 and may provide the processed result to the context hub 220. The cellular interface 217 may process a wireless signal received through the wireless antenna 127 (e.g., a cellular antenna) and may provide the processed result to the context hub 220. Information about a channel state or estimation, a call signal, a message receiving signal, etc. may be provided through the interface of the wireless antenna 127. In the case where a call signal is transmitted to the context hub 220 through the cellular interface 217, the context hub 220 may trigger a wake-up of the main processor 160 to allow the user to talk on the phone. The NFC interface 218 receives various wireless signals through the wireless antenna 128 and provides the received wireless signals to the context hub 220. Here, it may be well understood that the same wireless frequency or similar wireless frequencies used by the wireless antennas 125, 126, 127, and 128 are aggregated (or merged). The GNSS interface 215, WiFi interface 216, cellular interface 217, and NFC interface 218 are not limited to this disclosure, and it may be well understood that various wireless communication interfaces may be added.

The context hub 220 receives context data CD transmitted from the sensor unit 110 or each of the sensor interfaces of the image processor 211, the touch controller 212, the audio processor 213, GNSS interface 215, WiFi interface 216, cellular interface 217, and NFC interface 218. The context hub 220 may be configured to periodically monitor whether pieces of context data CD exist or to receive information indicating whether pieces of context data CD exist, when an event occurs. The context hub 220 may operate by using various DVFS levels depending on a pattern such as a type, a combination, or a data size of input context data CD. The context hub 220 may control a clock management circuit 242 such that the clock signal CLK is generated. The clock signal CLK is of a frequency optimized with respect to a pattern of the input context data CD. Alternatively, the context hub 220 may control the power management IC 205 such that the driving voltage VDD is generated. The driving voltage VDD is optimized with respect to a pattern of the input context data CD.

To operate by using various DVFS levels corresponding to patterns of input context data CD, the context hub 220 may be provided with information from a context input pattern information block 230. The context hub 220 may read a DVFS level corresponding to detected context data CD from the context input pattern information block 230. The context hub 220 may control the clock management circuit 243 to generate the clock signal CLK of a frequency corresponding to the DVFS level read from the context input pattern information block 230 and/or the driving voltage VDD of a level corresponding to the read DVFS level. The clock management circuit 243 adjusts a frequency of the clock signal CLK, which the context hub 220 uses for an operation, so as to correspond to the DVFS level provided from the context hub 220. The clock management circuit 243 may control the power management IC 205 so as to generate the driving voltage VDD, the level of which corresponds to the DVFS level provided from the context hub 220 and which the context hub 220 uses for an operation. The clock management circuit 243 may be provided with a source clock signal from an internal clock source circuit 241. However, it may be well understood that the clock management circuit 243 may be provided with a source clock signal from a clock source circuit (not illustrated) placed outside the system-on-chip 201.

When context data CD requiring a small computational burden is provided, the context hub 220 may control the clock management circuit 243 or the power management IC 205 so as to generate the clock signal CLK of a low frequency and/or the driving voltage VDD of a low level. In the case where a main processor 250 is in a sleep-mode state, the context hub 220 may operate at a DVFS level optimized for a pattern of context data CD input from the sensor unit 110 or the sensor interfaces of the image processor 211, the touch controller 212, the audio processor 213, GNSS interface 215, WiFi interface 216, cellular interface 217, and NFC interface 218. Accordingly, since the context hub 220 may operate at a low DVFS level with regard to a context input requiring a small computational burden, there may be minimized power consumption of the context hub 220 during a standby time when the mobile device 200 is in the sleep mode. In addition, since the clock signal CLK of the adjusted frequency is used, a latency which is needed to process context data at the context hub 220 may be minimized.

The context input pattern information block 230 defines a DVFS level associated with a pattern of context data CD input to the context hub 220. A frequency of the clock signal CLK and/or a level of the driving voltage VDD which is optimized with regard to context data patterns may be managed in the form of a table. A DVFS level corresponding to context data, which is stored in the context input pattern information block 230, may be provided as a value obtained through a simulation or various tests.

The main processor 250 may be a processor which controls the mobile device 200. The main processor 250 may perform data processing or an operation associated with a control and/or a communication of at least one other component of the mobile device 200. The main processor 250 may operate in the sleep mode in the case where the user drives a specific application program with low requirements or does not use the mobile device 200. However, when the main processor 250 is triggered by the context hub 220, the main processor 250 wakes up, that is, switches from the sleep mode to the active mode. Afterwards, the main processor 250 may be directly connected to a specific sensor or a specific sensor interface for the purpose of processing context data dumped from the context hub 220. In the present disclosure, it is assumed that the main processor 250 is in a sleep-mode state as a default state.

Configurations and features of the mobile device 200 of the present disclosure are briefly described above. The mobile device 200 includes the context hub 220 which changes a DVFS level depending on a context input pattern CIP of context data provided from sensors. The power which is consumed when sensors monitor ambient conditions during the sleep mode of the mobile device 200 may be markedly reduced by adjusting a level of the driving voltage VDD or a frequency of the clock signal CLK depending on the context input pattern CIP with regard to the context hub 220. In addition, since the clock signal CLK of the adjusted frequency is used, a latency which is needed to process context data at the context hub 220 may be minimized.

Figure 6:
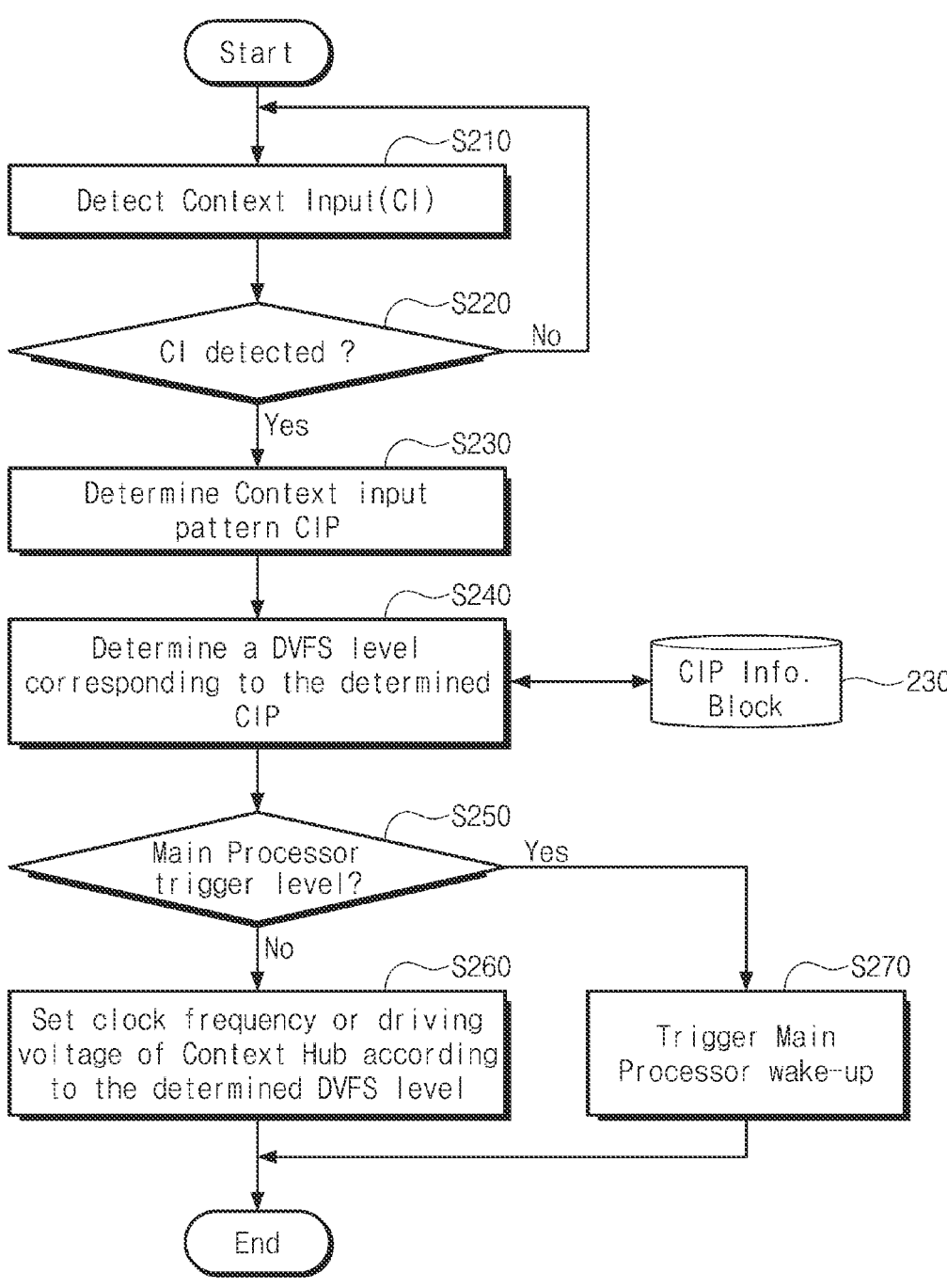
FIG. 6 is a flowchart illustrating an operation of a context hub illustrated in FIG. 5.

FIG. 6 is a flowchart illustrating an operation of a context hub illustrated in FIG. 5. Referring to FIG. 6, the context hub 220 may control a DVFS level depending on a context input pattern CIP of context data provided from at least one of multiple available sensors.

In operation S210, the context hub 220 checks for the existence of context input CI, i.e., by detecting whether the context input CI has been provided from the accelerometer 111, proximity sensor 112, humidity sensor 113, heart rate monitor 114, barometer 115, gyrometer 116, and magnetic sensor 117 or the sensor of the image processor 211, the touch controller 212, the audio processor 213, the GNSS interface 215, the WiFi interface 216, the cellular interface 217, and the NFC interface 218. For example, the context hub 220 may periodically check for the existence of sensor input, i.e., by detecting the existence of sensor input associated with the accelerometer 111, proximity sensor 112, humidity sensor 113, heart rate monitor 114, barometer 115, gyrometer 116, and magnetic sensor 117 or the sensor interfaces of the image processor 211, the touch controller 212, the audio processor 213, GNSS interface 215, WiFi interface 216, cellular interface 217, and NFC interface 218.

In operation S220, the context hub 220 branches depending on whether the context input CI is detected. In the case where the context input CI exists (S220=Yes), the procedure proceeds to operation S230. In contrast, in the case where the context input CI is not detected (S220=No), the procedure proceeds to operation S210 to continuously monitor whether the context input CI exists.

In operation S230, the context hub 220 determines the context input pattern CIP of the detected context input CI. To determine the context input pattern CIP, the context hub 220 may determine types of sensors associated with the context input CI. In addition, in the case where multiple context inputs CI are detected at a given detection time point, the context hub 220 may determine whether the context inputs CI are provided from any sensors. As such, the context hub 220 determines the context input pattern CIP.

In operation S240, the context hub 220 determines a DVFS level corresponding to the determined context input pattern CIP. The context hub 220 refers to information stored in the context input pattern information block 230 for the purpose of determining the DVFS level corresponding to the context input pattern CIP. A DVFS level optimized for each context input pattern CIP may be stored in the context input pattern information block 230.

In operation S250, the context hub 220 determines whether the context input CI corresponds to data that indicates to wake-up the main processor 250. In the case where the context input pattern CIP does not correspond to data that the main processor 250 should process (S250=No), the procedure proceeds to operation S260. In the case where the context input pattern CIP corresponds to data that the main processor 250 should process (S250=Yes), the procedure proceeds to operation S270.

In operation S260, the context hub 220 may set a frequency of the clock signal CLK and/or a level of the driving voltage VDD to the DVFS level corresponding to the context input pattern CIP. As described above, the clock signal CLK and the driving voltage VDD thus set may be provided to the context hub 220. That is, the context hub 220 may set the clock management circuit 243 or the power management IC 205 so as to generate the clock signal CLK and/or the driving voltage VDD corresponding to the determined dynamic voltage-frequency scaling level (DVFS level).

In operation S270, the context hub 220 may trigger the main processor 250 to wake up for the purpose of processing a sensor input corresponding to the context input pattern CIP. In this case, the context hub 220 may dump the context input CI provided from a sensor or data obtained by primarily processing the context input CI, on a working memory of the main processor 250.

How the context hub 220 of the present disclosure determines a DVFS level depending on the context input pattern CIP is briefly described above. As the context hub 220 of the present disclosure adjusts a DVFS level depending on the context input pattern CIP, the power which is consumed upon operating and managing sensors in the sleep mode of the mobile device 200 may be reduced. Also, a latency that is needed to process the context input CI at the context hub 220 may be minimized.

FIG. 7 is a table illustrating a DVFS level corresponding to a context input pattern defined in a context input pattern information block of FIG. 5. Referring to FIG. 7, the context input pattern information block 230 may define a DVFS level or a wake-up level of the main processor 250 according to the context input pattern CIP.

DVFS levels corresponding to context input patterns CIP provided from the sensor unit 110, accelerometer 111, proximity sensor 112, and humidity sensor 113 or the sensor interfaces of the image processor 211, the touch controller 212, the audio processor 213, GNSS interface 215, WiFi interface 216, cellular interface 217, and NFC interface 218 may be defined in a table of the context input pattern information block 230. In addition, in the case of a specific context input pattern CIP, table values may be mapped to allow the context hub 220 to trigger a wake-up of the main processor 250.

For example, when the context input pattern CIP is identified as context data Image (see FIG. 7) provided from the image sensor 121 or the image processor 211, the corresponding DVFS level may be "$f_0+2f_m$". That is, the context data Image provided from the image sensor 121 or the image processor 211 to the context hub 220 indicates that the context hub 220 should operate by using the clock signal CLK of the frequency "$f_0+2f_m$" and/or the driving voltage VDD of the corresponding level to the frequency "$f_0+2f_m$".

When the context input pattern CIP is identified as context data GNSS (see FIG. 7) provided from the GNSS interface 215, the corresponding DVFS level may be "$f_0$". That is, the context data GNSS provided from the GNSS interface 215 to the context hub 220 indicates that the context hub 220 should operate by using the clock signal CLK of the frequency "$f_0$" and/or the driving voltage VDD of the corresponding level to the frequency "$f_0$".

In addition, when the context input pattern CIP is identified as context data Cellular (see FIG. 7) provided from the cellular interface 217, the context hub 220 may be controlled to trigger a wake-up of the main processor 250. Also, when the context input pattern CIP is identified as a combination of context data Image and Audio provided from the image processor 211 and the audio processor 213, the context hub 220 may be controlled to trigger a wake-up of the main processor 250.

DVFS levels corresponding to some context input patterns CIP are described above. However, DVFS levels corresponding to all possible context input patterns CIP may be defined for a mobile device 200. Alternatively, fewer than all possible context input patterns CIP may be defined. For example, the context input pattern information block 230 may define only DVFS levels corresponding to one or more context input pattern CIPs which is/are frequently generated or which is/are important. Additionally, the context input pattern information block 230 may define a DVFS level of a default value for the remaining context input patterns CIPs.

As described above, as the DVFS level of the context hub 220 corresponding to each context input pattern CIP is optimally set, the power consumption of the mobile device 200 when the main processor 250 is in the sleep mode may be minimized. Also, a latency that is needed to process the context input CI at the context hub 220 may be minimized.

Figure 8:
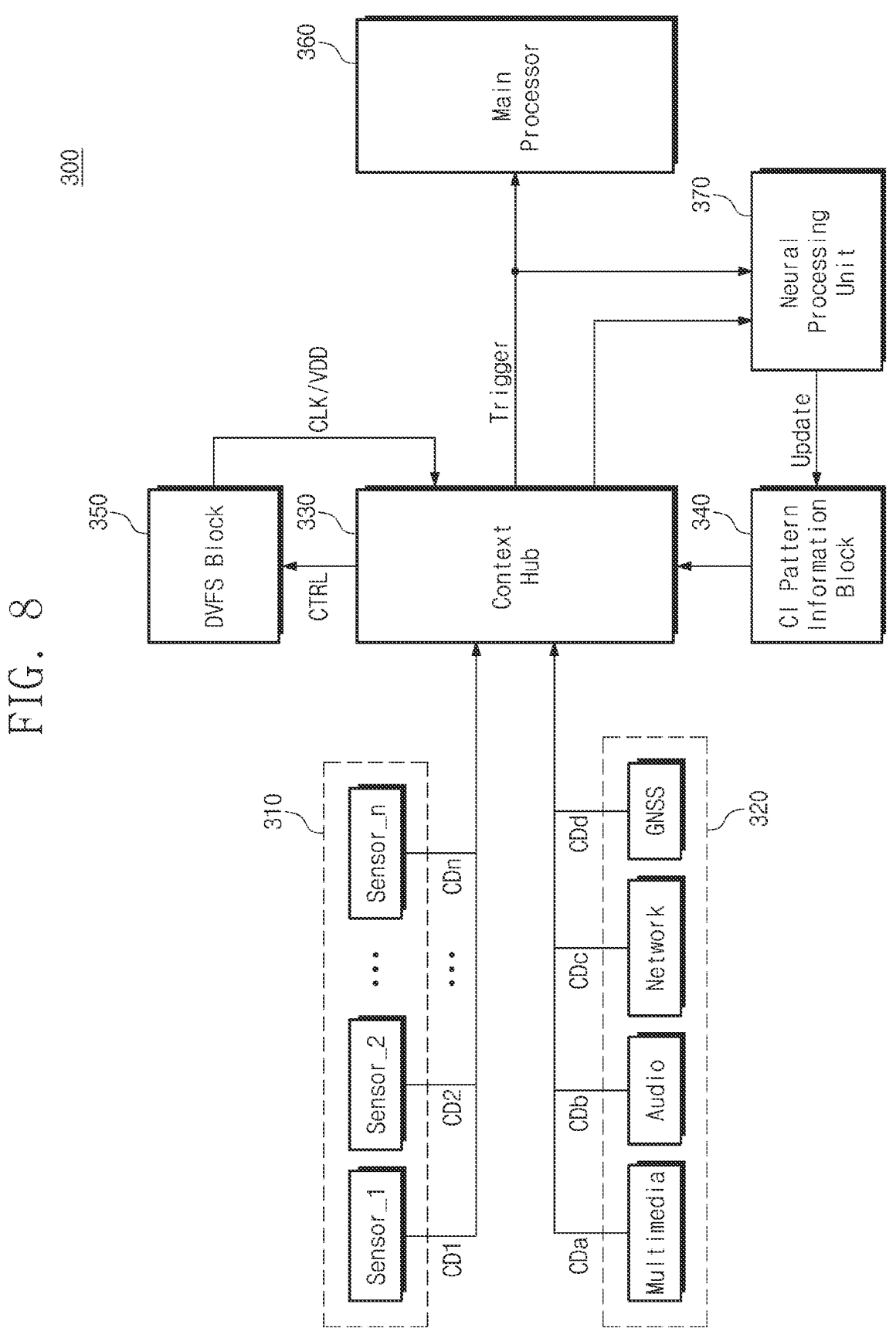
FIG. 8 is a block diagram illustrating an electronic device according to another embodiment of the present disclosure.

FIG. 8 is a block diagram illustrating an electronic device according to another embodiment of the present disclosure. Referring to FIG. 8, an electronic device 300 includes a sensor unit 310, a context unit 320, a context hub 330, a context input pattern information block 340, a DVFS block 350, a main processor 360, and a neural processing unit (hereinafter referred to as "NPU") 370.

The sensor unit 310 includes multiple sensors Sensor_1 to Sensor_n. Each of the sensors Sensor_1 to Sensor_n may sense various physical or chemical changes and may convert the sensed result to an electrical signal. The sensor unit 310 may be implemented with one or more modules. A configuration or a function of the sensor unit 310 is substantially the same as those described with reference to FIG. 1. Thus, additional description will be omitted to avoid redundancy.

The context unit 320 may include a multimedia module, an audio module, a network module, and a GNSS module for the purpose of monitoring or processing various wired/wireless inputs or voice inputs/outputs provided in the electronic device 300. The multimedia module, the audio module, the network module, and the GNSS module may respectively generate pieces of context data CDa, CDb, CDc, and CDd and may provide the context data CDa, CDb, CDc, and CDd to the context hub 330. A configuration or a function of the context unit 320 is substantially the same as those described with reference to FIG. 1. Thus, additional description will be omitted to avoid redundancy.

The context unit 320 processes the context data CD1 to CDn provided by the sensors Sensor_1 to Sensor_n included in the sensor unit 310. The context hub 330 may include a processor in a form described above, such as a microprocessor or an ASIC. The context hub 330 may process the context data CDa to CDd which the context unit 320 outputs. The context hub 330 may receive the context data CD1 to CDn and CDa to CDd periodically or randomly. The context hub 330 may operate in various DVFS modes depending on types of the input context data CD1 to CDn and CDa to CDd, a combination thereof, and/or attributes thereof. That is, the context hub 330 may select a frequency of the clock signal CLK and/or a level of the driving voltage VDD depending on the input context data CD1 to CDn and CDa to CDd. Here, the context hub 330 identifies a pattern of currently input context data CD1 to CDn and CDa to CDd and compares the identified pattern with information stored in the context input pattern information block 340. Depending on a result of the comparison, the context hub 330 may control the DVFS block 350 such that the frequency of the clock signal CLK and/or the level of the driving voltage VDD is controlled. That is, the DVFS block 350 may be configured to control the frequency of the clock signal CLK to be provided to the context hub 330 or the driving voltage to be provided to the context hub 330 under control of the context hub 330.

When context data requiring a small computational burden is provided, the context hub 330 may be controlled to be driven with the clock signal CLK of a low frequency or the driving voltage VDD of a low level. In the case where the main processor 360 is in the sleep mode, the context unit 320 may process context data from the sensor unit 310 (or module) with a low power and allow the main processor 360 to remain in the sleep mode.

The context input pattern information block 340 defines a DVFS level corresponding to each of patterns of context data CD1 to CDn and CDa to CDd input to the context hub 330. The context input pattern information block 340 provides the context hub 330 with the clock signal CLK and/or the driving voltage VDD having a frequency or a level optimized with regard to each of patterns of the context data CD1 to CDn and CDa to CDd. In particular, DVFS levels which are optimized with regard to the patterns of the context data CD1 to CDn and CDa to CDd and are stored in the context input pattern information block 340 may be set to default values and may be updated by the NPU 370.

The DVFS block 350 may generate the driving voltage VDD and the clock signal CLK which are used to drive the context hub 330. For example, the DVFS block 350 may include clock generating circuits and/or a power circuit that generates a driving voltage to be provided to the context hub 330. The DVFS block 350 may adjust a frequency of the clock signal CLK and/or a level of the driving voltage VDD under control of the context hub 330. The DVFS block 350 may adjust a frequency of the clock signal CLK and/or a level of the driving voltage VDD in response to a control signal CTRL which is generated according to a pattern of the context data CD1 to CDn and CDa to CDd input to the context hub 330.

The main processor 360 may operate in an active mode and a sleep mode. For example, in the sleep mode, the main processor 360 is maintained in a state where overall operations for controlling the electronic device 300 or executing an application program are stopped. In contrast, when the main processor 360 is triggered by the context hub 330, the main processor 360 wakes up, that is, switches from the sleep mode to the active mode. Afterwards, the main processor 360 may perform an operation for processing context data dumped from the context hub 330. In the present disclosure, it is assumed that the main processor 360 is in a sleep-mode state as a default state.

The NPU 370 performs a function of machine learning to be performed in the electronic device 300. In general, in the case where a machine learning algorithm is executed by the main processor 360, it may be disadvantageous in terms of speed or power efficiency. In contrast, in the case of using the NPU 370 specialized for machine learning, learning for various input data may be efficiently made. In particular, the NPU 370 of the present disclosure learns an optimum DVFS level for a pattern of the context data CD1 to CDn. The NPU 370 may update the context input pattern information block 340 with the optimum training DVFS level corresponding to the pattern of the context data CD1 to CDn and CDa to CDd. In the case where a score of a training result obtained by using the machine learning is lower than a score of an initial parameter stored as a default value, the NPU 370 may skip updating the context input pattern information block 340.

In other words, as described above, the context hub 330 may perform an operation method including reading the dynamic voltage-frequency scaling level (DVFS level) corresponding to the identified context input pattern from the context input pattern information block 340. The context input pattern information block 340 may provide the context hub 330 with initial data that is not learned by machine learning (e.g., a default value) before the machine learning is completed, and then with optimum training data obtained by the machine learning after the machine learning is completed. The optimum training data may include a score used to determine whether to update the context input pattern information block 340 with the optimum training data.

Here, a description is given as the NPU 370 is hardware. However, it may be well understood that the NPU 370 may be implemented with a neural processing engine (NPE) driven by the main processor 360. In addition, a function of the NPU 370 may be performed by an external device (e.g., a server) of the electronic device 300.

Configurations and features of the electronic device 300 of the present disclosure are briefly described above. The electronic device 300 includes the context hub 330 in which a frequency of the clock signal CLK and/or a level of the driving voltage VDD is adjusted according to a pattern of the context data CD1 to CDn or CDa to CDd provided from the sensor unit 310 or the context unit 320. In addition, an optimum DVFS level according to a pattern of the context data CD1 to CDn or CDa to CDd may be updated from an initial input value that is a default value input in advance, to a training value obtained through the machine learning. Accordingly, the electronic device 300 may dynamically change an optimum DVFS level corresponding to a pattern of the context data CD1 to CDn or CDa to CDd depending on a user environment.

Figure 9:
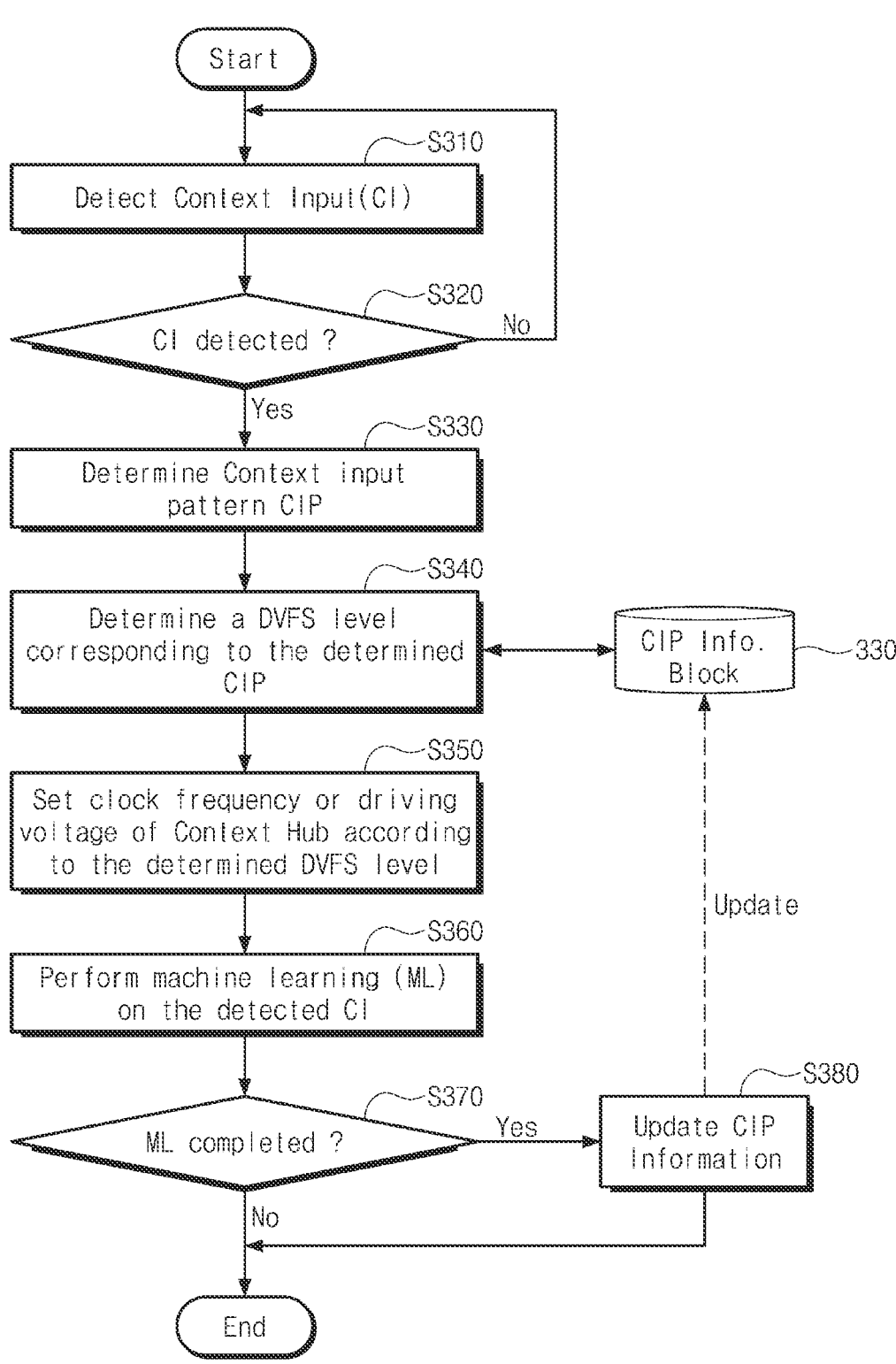
FIG. 9 is a flowchart illustrating an operation of a context hub of FIG. 8.

FIG. 9 is a flowchart illustrating an operation of a context hub of FIG. 8. Referring to FIG. 9, the context hub 330 may perform machine learning on a DVFS level corresponding to a context input pattern CIP provided from the sensor unit 310 or the context unit 320. As such, a DVFS level corresponding to a context input pattern CIP may be adjusted to be optimized for a change of a use environment, and thus, the power efficiency of the context unit 320 optimized for various embodiments may be secured.

In operation S310, the context hub 330 monitors whether a context input CI from the sensor unit 310 or the context unit 320 exists. For example, the context hub 330 may periodically monitor a signal transmitted from the sensor unit 310 or the context unit 320.

In the case where it is determined in operation S320 that the context input CI input to the context unit 320 exists (S320=Yes), the procedure proceeds to operation S330. In contrast, in the case where the context input CI does not exist (S320=No), the procedure returns to operation S310 to detect the context input CI.

In operation S330, the context hub 330 determines the context input pattern CIP of the detected context input CI. To determine the context input pattern CIP, the context hub 330 may determine types of sensors corresponding to the context input CI. In addition, in the case where multiple context inputs CI are detected at a given detection time point, the context hub 330 may determine whether the context inputs CI are provided from any sensors or interfaces. As such, the context hub 330 determines the context input pattern CIP.

In operation S340, the context hub 330 determines a DVFS level corresponding to the determined context input pattern CIP. That is, the context hub 330 identifies the context input pattern CIP to search for a DVFS level stored in the context input pattern information block 340. The context hub 330 refers to information stored in the context input pattern information block 340 for the purpose of determining the DVFS level corresponding to the context input pattern CIP. A DVFS level optimized for each context input pattern CIP may be stored in the context input pattern information block 340.

In operation S350, the context hub 330 may set the DVFS block 350 with the determined dynamic voltage-frequency scaling level (DVFS level). As such, the DVFS block 350 may generate the clock signal CLK of the set frequency and/or the driving voltage VDD of the set level and may provide the clock signal CLK and/or the driving voltage VDD to the context hub 330.

In operation S360, machine learning is performed on the DVFS level corresponding to the context input pattern CIP. The machine learning may be performed by the NPU 370 by using the context input pattern CIP as an input.

In operation S370, the NPU 370 determines whether the machine learning is completed. For example, the NPU 370 may determine whether the context input pattern CIP for the user of the electronic device 300 is sufficiently sampled and whether learning using the sampled data is sufficient. In the case where it is determined that the machine learning is completed (S370=Yes), the procedure proceeds to operation S380. In contrast, in the case where it is determined that accumulation of the context input pattern CIP or the number of times of the machine learning is insufficient (S370=No), the procedure may end.

In operation S380, the NPU 370 may update data stored in the context input pattern information block 340 to a value determined through the machine learning. For example, the context input pattern information block 340 may store a predetermined DVFS level as a default value input in advance, and the NPU 370 may update the DVFS level to a training value obtained as an execution result of machine learning.

An embodiment in which machine learning is performed on the context input pattern CIP input to the context hub 330 of the present disclosure is briefly described above. The context hub 330 which may operate adaptively to an environment change may be implemented by applying the machine learning.

Figure 10:
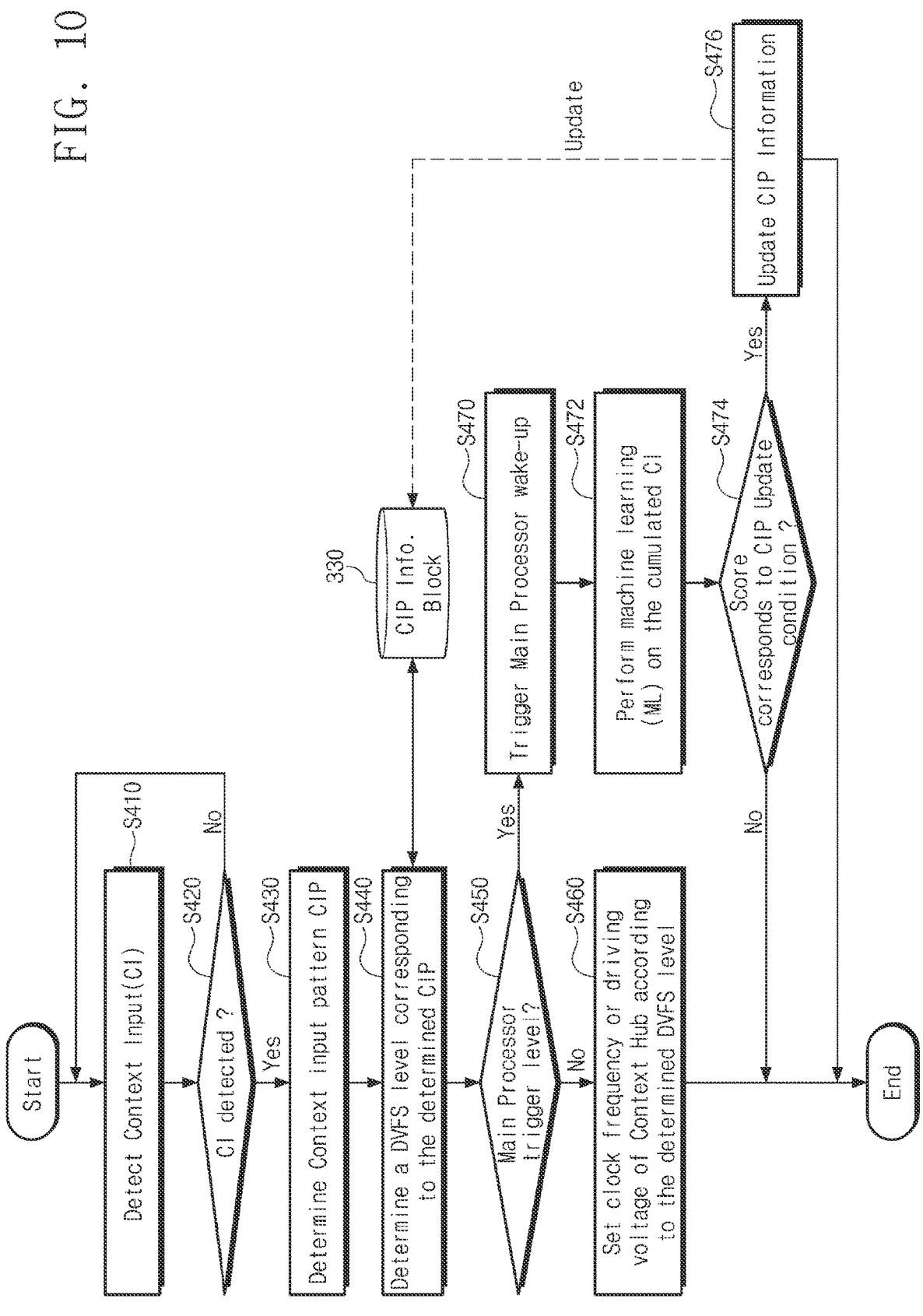
FIG. 10 is a flowchart illustrating another example of an operation of a context hub of FIG. 8.

FIG. 10 is a flowchart illustrating another example of an operation of a context hub of FIG. 8. Referring to FIG. 10, the context hub 330 may perform machine learning on a DVFS level corresponding to a context input pattern CIP provided from the sensor unit 310. However, a time point when the NPU 370 is activated for the machine learning is synchronized with a time point when the main processor 160 wakes up. Here, operation S410 to operation S440 are substantially the same as operation S310 to operation S340 of FIG. 9. Thus, additional description will be omitted to avoid redundancy.

Through operation S410 to operation S440, the context hub 330 determines a DVFS level corresponding to the context input pattern CIP.

In operation S450, the context hub 330 determines whether the context input CI corresponds to data that indicates to wake-up the main processor 360. In the case where the context input pattern CIP does not correspond to data that the main processor 360 should process (S450=No), the procedure proceeds to operation S460. In the case where the context input pattern CIP corresponds to data that the main processor 360 should process (S450=Yes), the procedure proceeds to operation S470.

In operation S460, the context hub 330 may set a frequency of the clock signal CLK and/or a level of the driving voltage VDD to the DVFS level corresponding to the context input pattern CIP. As described above, the clock signal CLK and the driving voltage VDD thus set may be provided to the context hub 330. That is, the context hub 330 may set the DVFS block 350 so as to generate the clock signal CLK and the driving voltage VDD corresponding to the determined DVFS level.

In operation S470, the context hub 330 may trigger a wake-up of the main processor 360 for the purpose of processing a sensor input corresponding to the context input pattern CIP. In this case, the context hub 330 may dump a sensor input provided from a sensor or data obtained by primarily processing the sensor input, on a working memory of the main processor 360.

In operation S472, the NPU 370 performs machine learning on the DVFS level corresponding to the context input pattern CIP. Various deep learning schemes may be used as a technique of the machine learning. In addition, the NPU 370 may perform the machine learning on the DVFS level corresponding to the context input pattern CIP by using various machine learning techniques such as a neural network algorithm, a decision tree, a convolutional neural network (CNN), a support vector machine (SVM), K-nearest neighbor (K-NN) algorithm, and reinforcement learning.

In operation S474, the NPU 370 determines whether to update data stored in the context input pattern information block 340 to the training data by using a result of the machine learning. For example, the NPU 370 may determine whether to update the context input pattern information block 340 with the corresponding DVFS level to the context input pattern CIP changed by the machine learning with reference to a score value obtained as the result of the machine learning. In the case where it is determined that the update of the context input pattern information block 340 is unnecessary (S474=No), the procedure ends. In contrast, in the case where it is determined that the update of the context input pattern information block 340 is necessary (S474=Yes), the procedure proceeds to operation S476.

In operation S476, the NPU 370 may update data stored in the context input pattern information block 340 to a value newly determined through the machine learning. For example, the NPU 370 may store a DVFS level for a context input pattern CIP in the context input pattern information block 340 as a default value input in advance, and then update the DVFS level for the context input pattern CIP to a training value obtained by machine learning.

An embodiment in which machine learning is performed on the context input pattern CIP input to the context hub 330 of the present disclosure is briefly described above. The context hub 330 which may adapt to a change of an operation environment may be implemented by applying the machine learning.

Figure 11:
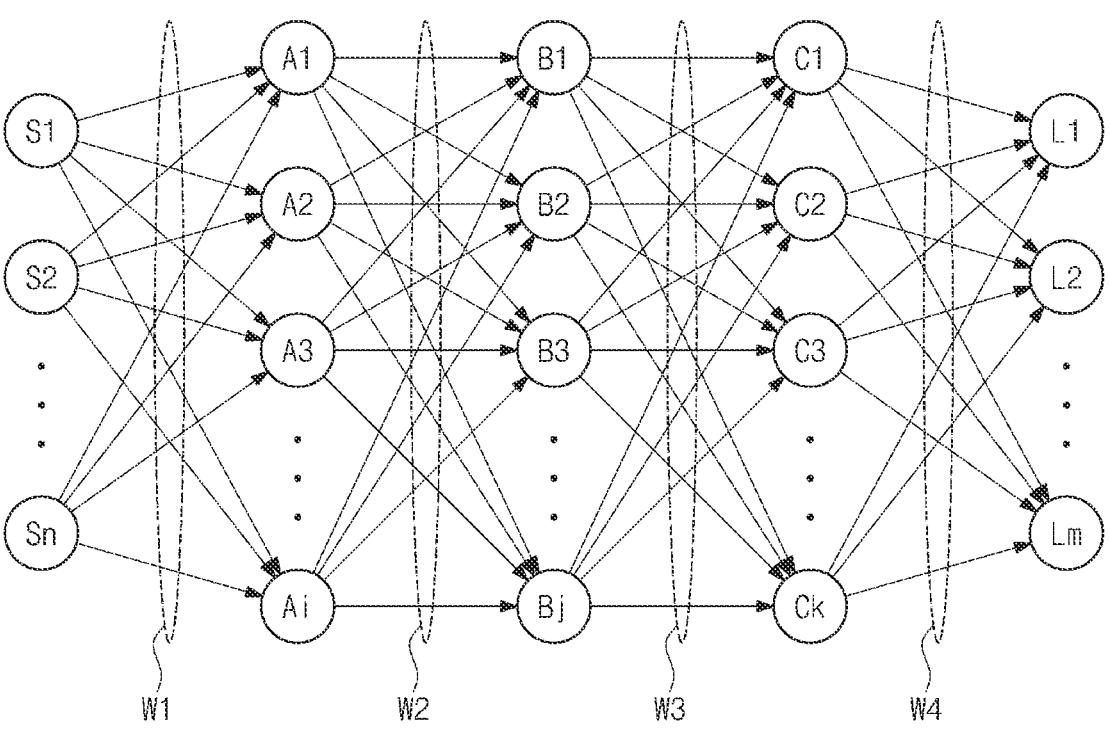
FIG. 11 is a diagram illustrating an operation in a neural processing unit (NPU) of the present disclosure.

FIG. 11 is a diagram illustrating an operation in a neural processing unit (NPU) of the present disclosure. Referring to FIG. 11, the NPU 370 (refer to FIG. 8) may operate depending on various machine learning techniques, but may perform machine learning by using a convolutional neural network (CNN) algorithm. For example, the NPU 370 may process an operation for the CNN including multiple layers Ai, Bj, and Ck for defining a connection relationship between received sensor input patterns S1 to Sn and multiple DVFS levels L1 to Lm corresponding to the sensor input patterns S1 to Sn.

When the sensor input patterns S1 to Sn corresponding to an input feature are provided, the NPU 370 connects the sensor input patterns S1 to Sn to nodes A1, A2, . . . , Ai (i being a natural number) with a first weight W1. The nodes A1, A2, . . . , Ai constituting a convolution layer are connected with nodes B1, B2, . . . , Bj (j being a natural number) constituting a convolution layer with a connection level of a second weight W2 corresponding to a learning parameter. The nodes B1, B2, . . . , Ai constituting a convolution layer are connected with nodes C1, C2, . . . , Ck (k being a natural number) constituting a convolution layer with a learning parameter of a third weight W3. In addition, the nodes C1, C2, . . . , Ck may constitute a fully connected layer with nodes corresponding to the DVFS levels L1, L2, . . . , Lm. The fully connected layer has a learning parameter of a fourth weight W4.

The NPU 370 may perform a convolution operation for updating learning parameters between the sensor input patterns S1 to Sn and the DVFS levels L1 to Lm corresponding to the sensor input patterns S1 to Sn. However, it may be well understood that the scheme of the machine learning performed by the NPU 370 is not limited to the above-described convolutional neural network scheme.

Figure 12:
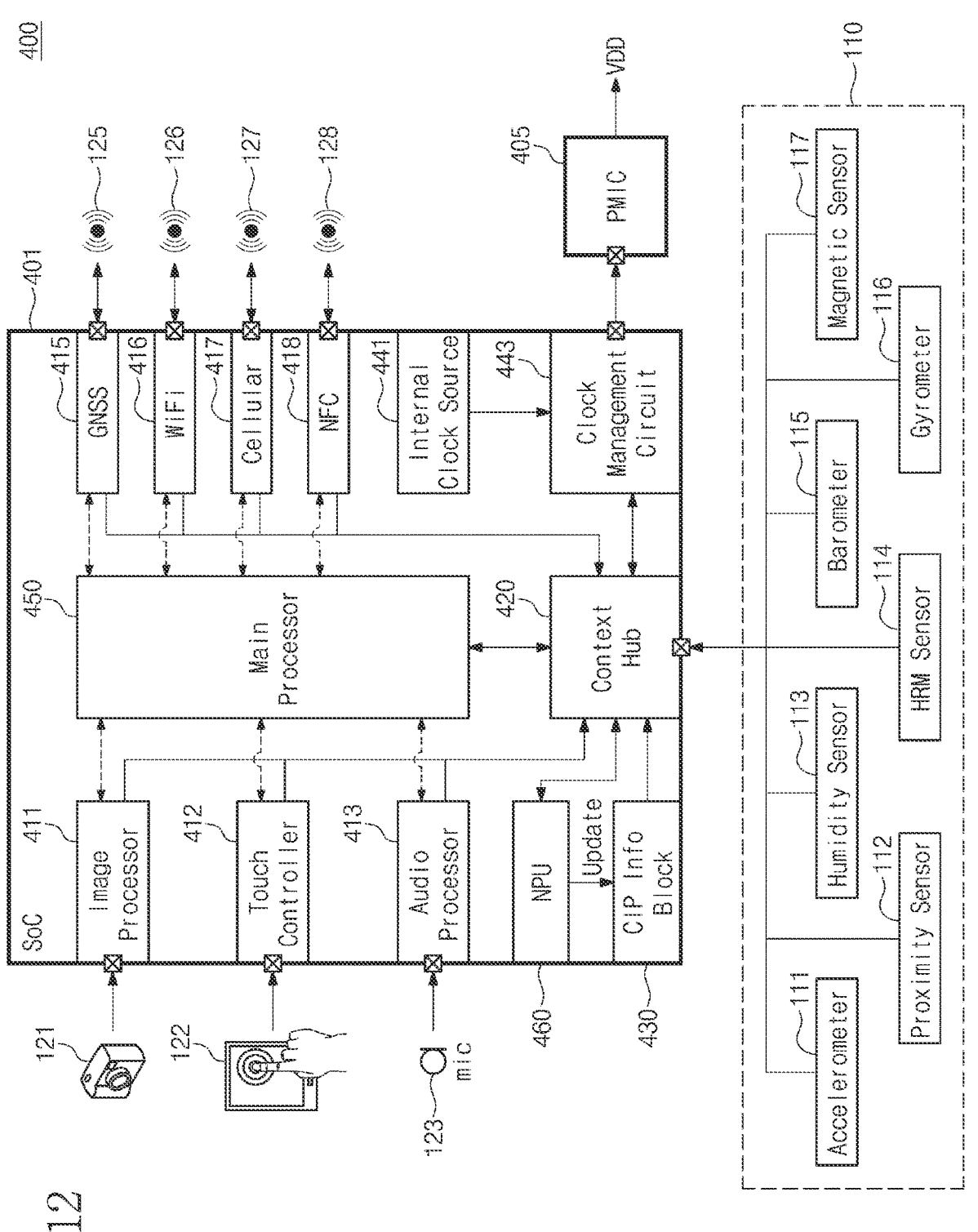
FIG. 12 is a block diagram illustrating a mobile device having a context hub according to another embodiment of the present disclosure.

FIG. 12 is a block diagram illustrating a mobile device having a context hub according to another embodiment of the present disclosure. Referring to FIG. 12, a mobile device 400 may include a system-on-chip 401, the sensor unit 110, image sensor 121, touch pad 122, and microphone 123, the wireless antennas 125, 126, 127, and 128, and a power management IC 405 (power management integrated circuit or PMIC). The system-on-chip 401 includes a context hub 420 which may change a DVFS level depending on a context input pattern CIP and an NPU 460 which performs machine learning on the context input pattern CIP. The context hub 420 may include a processor as described above, such as a microprocessor or an ASIC.

Here, the sensor unit 110, image sensor 121, touch pad 122, and microphone 123, the wireless antennas 125, 126, 127, and 128, and the power management IC 405 are substantially the same as those of FIG. 5. Thus, additional description will be omitted to avoid redundancy. In addition, sensor interfaces 411, 412, 413, 415, 416, 417, and 418, a main processor 450, an internal clock source 441, and a clock management circuit 443 included in the system-on-chip 401 are substantially the same as those of FIG. 5.

In contrast, the system-on-chip 401 includes the NPU 460 which performs machine learning on the context input pattern CIP input to the context hub 420. In particular, the NPU 460 of the present disclosure learns an optimum DVFS level for the context input pattern CIP input to the context hub 420. The NPU 460 may update a context input pattern information block 430 with the optimum training DVFS level corresponding to the context input pattern CIP. In the case where a score of a training result obtained by using the machine learning is lower than a score of an initial parameter stored as a default value, the NPU 460 may skip updating the context input pattern information block 430. In other words, the DVFS level for a context input pattern CIP is stored in the context input pattern information block 430 as a default value input in advance and then updated to a training value obtained by machine learning. The training value may also be referred to as a training parameter, and is obtained through the machine learning described above. Accordingly, the NPU 460 updates the context input pattern information block 430 with a training value or training parameter obtained through the machine learning when the machine learning is completed.

Here, a description is given as the NPU 460 is hardware. However, it may be well understood that the NPU 460 may be implemented with a neural processing engine (NPE) driven by the main processor 450. In addition, a function of the machine learning which the NPU 460 performs may be performed by an external device (e.g., a server) of the mobile device 400.

According to the above-described configuration and feature of the mobile device 400, the mobile device 400 includes the context hub 420 which changes a DVFS level depending on a pattern (i.e., contest input pattern CIP) of context data provided from sensors. As the NPU 460 performs machine learning on the DVFS level according to an input pattern (i.e., contest input pattern CIP) of context data, the DVFS level may be optimized. Accordingly, the context hub 420 may adjust the DVFS level adaptively to a change of a driving environment of the mobile device 400 or to a user change. As a result, the power which is consumed when sensors monitor ambient conditions during the sleep mode of the mobile device 400 may be markedly reduced through an operation of the context hub 420. Also, a latency that is needed to process the context input CI at the context hub 420 may be minimized.

Figure 13:
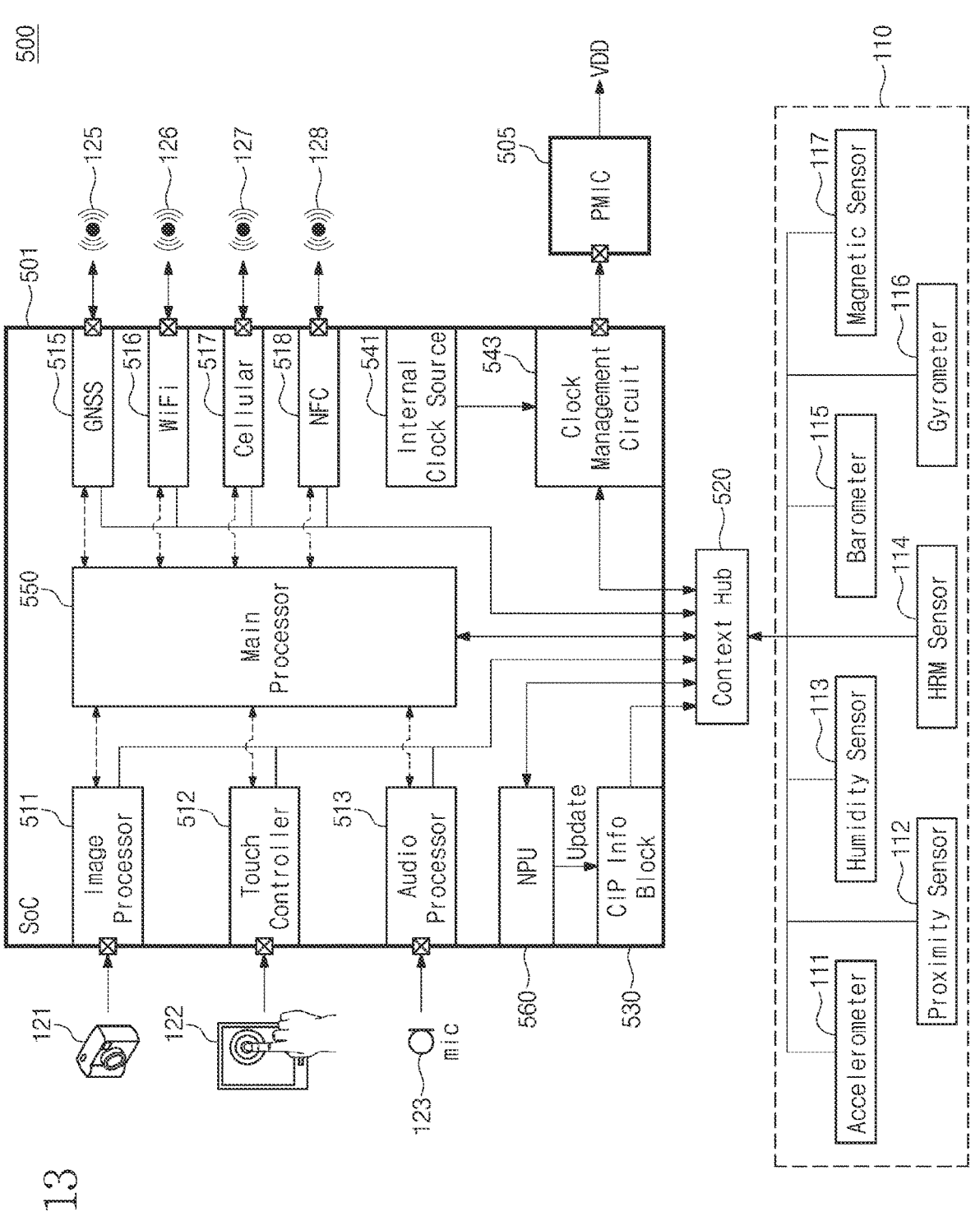
FIG. 13 is a block diagram illustrating a mobile device having a context hub according to another embodiment of the present disclosure.

FIG. 13 is a block diagram illustrating a mobile device having a context hub according to another embodiment of the present disclosure. Referring to FIG. 13, a mobile device 500 may include a system-on-chip 501, the sensor unit 110, image sensor 121, touch pad 122, and microphone 123, the wireless antennas 125, 126, 127, and 128, and a power management IC 505.

The system-on-chip 501 includes a context hub 520 which may change a DVFS level depending on a context input pattern CIP and an NPU 560 which performs machine learning on the context input pattern CIP. However, the context hub 520 may be provided as a device which is separated from the system-on-chip 501. The context hub 520 may be provided together with the sensor unit 110 or may be implemented with a separate chip.

Figure 14:
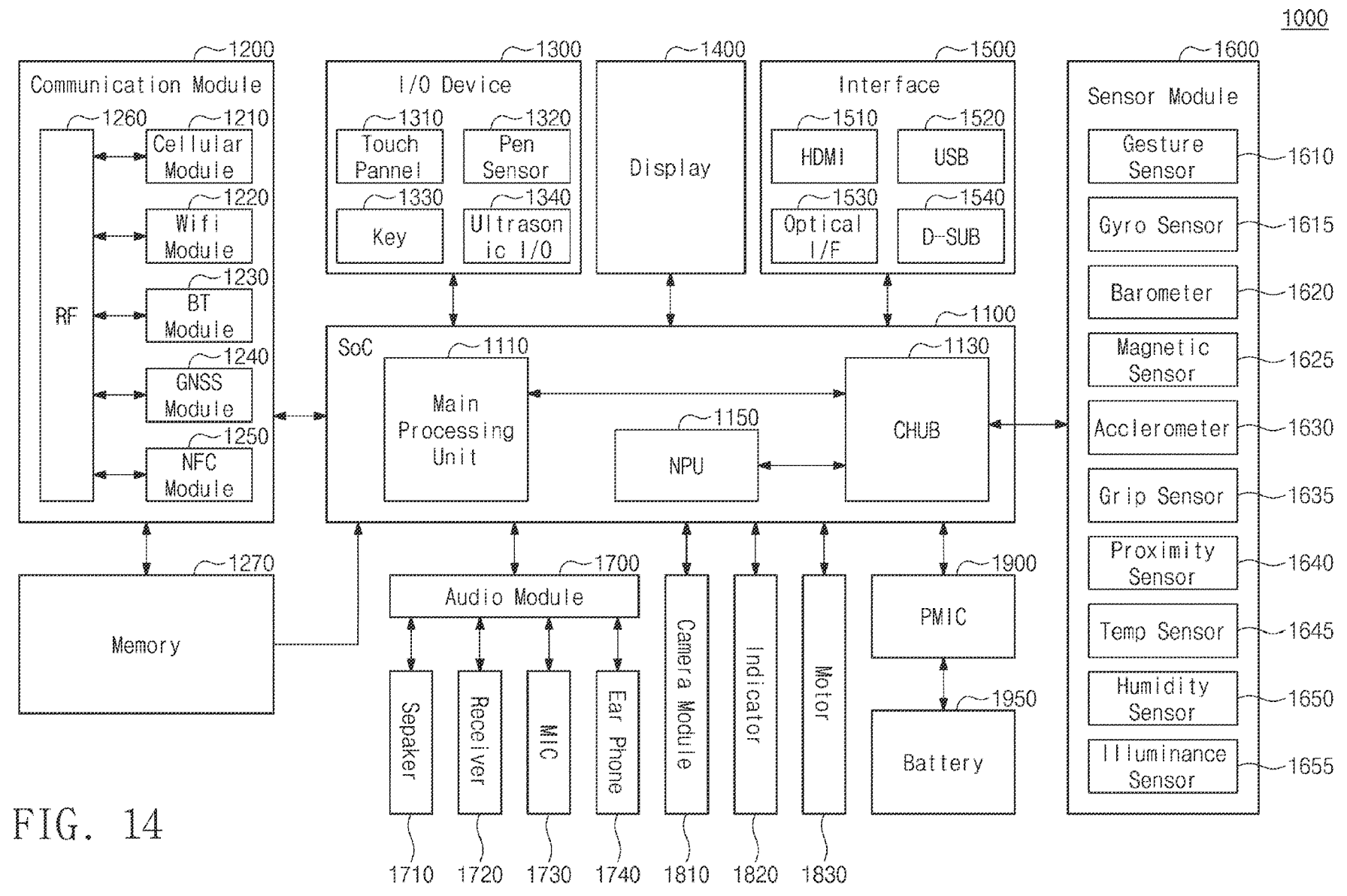

FIG. 14 is a block diagram illustrating an electronic device according to an embodiment of the present disclosure. Referring to FIG. 14, an electronic device 1000 may include a system-on-chip 1100 provided as an application processor, a communication module 1200, a memory 1270, an input/output device 1300, a display 1400, an interface 1500, a sensor module 1600, an audio module 1700, a camera module 1810, an indicator 1820, a motor 1830, a PMIC 1900, and a battery 1950.

The system-on-chip 1100 may drive an operating system or an application program to control multiple hardware or software components included in the electronic device 1000. According to another embodiment, the system-on-chip 1100 may further include a graphic processing unit (GPU) and/or an image signal processor (ISP). The system-on-chip 1100 may include a main processing unit 1110, a context hub 1130, and an NPU 1150.

The context hub 1130 receives and processes context data provided by multiple sensors. The context hub 1130 may receive context data provided by the sensors periodically or randomly. The context hub 1130 of the present disclosure may operate in various DVFS modes (or levels) depending on a pattern of the input context data. That is, the context hub 1130 may adjust a frequency of a clock signal CLK and/or a level of a driving voltage VDD depending on the pattern of the input context data.

The NPU 1150 performs a function of machine learning to be performed in the electronic device 1000. The NPU 1150 performs machine learning on a DVFS level on a pattern context data provided by the sensors, and may optimize the DVFS level. The NPU 1150 may operate at the DVFS level optimized according to the training result. Here, a description is given as the NPU 1150 is implemented with hardware. However, it may be well understood that the NPU 1150 may be implemented with a neural processing engine (NPE) driven by the main processing unit 1110. In addition, a function of the NPU 1150 may be performed by an external device (e.g., a server) of the electronic device 1000.

The communication module 1200 may include a cellular module 1210, a wireless-fidelity (Wi-Fi) module 1220, a Bluetooth (BT) module 1230, a GNSS module 1240, a near field communication (NFC) module 1250, and a radio frequency (RF) module 1260. In addition, the input/output device 1300 may include a touch panel 1310, a pen sensor 1320, a key 1330, and an ultrasonic input/output device 1340. The interface 1500 may include a HDMI 1510, a USB 1520, an optical interface 1530, and a D-SUB 1540. In an embodiment, the sensor module 1600 may include at least one of a gesture sensor 1610, a gyro sensor 1615, a barometer 1620, a magnetic sensor 1625, an accelerometer 1630, a grip sensor 1635, a proximity sensor 1640, a temperature sensor 1645, a humidity sensor 1650, and an illuminance sensor 1655.

Configurations and features of the electronic device 1000 of the present disclosure are briefly described above. The electronic device 1000 includes the context hub 1130 in which a frequency of the clock signal CLK and/or a level of the driving voltage VDD is adjusted according to a pattern of context data provided from the sensor module 1600. According to the above configuration, the electronic device 1000 may minimize the power which is consumed to monitor a change of an ambient environment in the sleep mode of the main processing unit 1110. In addition, a latency which is generated at the context hub 1130 to process context data transmitted from the sensor module 1600 may be minimized.

According to a context hub and an operation method thereof, even though the number of sensors to be managed sharply increases, power consumption of the context hub managing data from the sensors may be markedly reduced. In addition, a latency which is needed to process context data at the context hub may be minimized.

While the inventive concept(s) of the present disclosure have been described with reference to exemplary embodiments thereof, it will be apparent to those of ordinary skill in the art that various changes and modifications may be made thereto without departing from the spirit and scope of the inventive concept(s) as set forth in the following claims.

What is claimed is:

1. An electronic device, comprising:
a plurality of sensors configured to generate context data;
a context input pattern information circuit configured to store context input pattern information;
a main processor; and
a context hub configured to:
   receive the context data from the plurality of sensors;
   identify a pattern of the context data, wherein the pattern comprises a plurality of data types and a data size of the context data;
   read the context input pattern information from the context input pattern information circuit based on the identified pattern; and
   trigger the main processor based on the context input pattern information.

2. The electronic device of claim 1, wherein the pattern of the context data varies depending on currently operating sensors from among the plurality of sensors.

3. The electronic device of claim 2, wherein the plurality of sensors are configured to sense different types of environmental characteristics.

4. The electronic device of claim 3, wherein the pattern of the context data comprises a type of communication mechanism by which the context data is received and/or a type of format of the context data.

5. The electronic device of claim 1, wherein the context hub is further configured to:

determine a dynamic voltage-frequency scaling (DVFS) level corresponding to the identified pattern, based on the context input pattern information; and generate a control signal corresponding to the DVFS level.

6. The electronic device of claim 5, further comprising:

a DVFS circuit configured to generate at least one of a clock signal having a controlled frequency and a driving voltage having a controlled voltage level based on the control signal from the context hub, and wherein the context hub is further configured to:

output the control signal to the DVFS circuit;

receive the at least one of the clock signal and the driving voltage from the DVFS circuit; and process the context data by using the at least one of clock signal and the driving voltage.

7. The electronic device of claim 1, wherein the context input pattern information correlates a plurality of optimized DVFS levels with a plurality of patterns of the context data.

8. The electronic device of claim 1, wherein the main processor is configured to operate in a low power mode before triggered by the context hub, and operate in a high power mode after triggered by the context hub.

9. The electronic device of claim 8, wherein the low power mode is a sleep mode and the high power mode is an active mode.

10. The electronic device of claim 1, wherein the context hub is further configured to partially process the context data, and dump the partially processed context data to a working memory of the main processor after triggering the main processor, and wherein the main processor is configured to process the partially processed and dumped context data.

11. The electronic device of claim 1, wherein the context input pattern information circuit is further configured to:

update a default value to a training value by machine learning; and store the training value as the context input pattern information.

12. The electronic device of claim 1, further comprising a neural processing unit configured to:

receive the identified pattern from the context hub;

perform machine learning on the identified pattern;

generate an optimized DVFS level corresponding to the identified pattern based on the machine learning; and update the context input pattern information of the context input pattern information circuit based on the optimized DVFS level.

13. An electronic device, comprising:

a first integrated circuit configured to generate context data;

a memory circuit configured to store context input pattern information;

an application processor; and a second integrated circuit configured to:

receive the context data from the first integrated circuit;

identify a pattern of the context data, wherein the pattern comprises a plurality of data types and a data size of the context data;

read the context input pattern information from the memory circuit based on the identified pattern; and trigger the application processor based on the context input pattern information.

14. The electronic device of claim 13, wherein the first integrated circuit includes a plurality of sensors, wherein the pattern of the context data varies depending on currently operating sensors from among the plurality of sensors, and wherein the plurality of sensors are configured to sense different types of environmental characteristics.

15. The electronic device of claim 13, wherein the second integrated circuit is further configured to:

determine a dynamic voltage-frequency scaling (DVFS) level corresponding to the identified pattern, based on the context input pattern information; and generate a control signal corresponding to the DVFS level.

16. The electronic device of claim 15, further comprising:

a DVFS circuit configured to generate at least one of a clock signal having a controlled frequency and a driving voltage having a controlled voltage level based on the control signal from the second integrated circuit, and wherein the second integrated circuit is further configured to:

output the control signal to the DVFS circuit;

receive the at least one of the clock signal and the driving voltage from the DVFS circuit; and process the context data by using the at least one of clock signal and the driving voltage.

17. A method of operating an electronic device, the method comprising:

generating context data by a first integrated circuit of the electronic device;

identifying a pattern of the context data by a second integrated circuit of the electronic device, wherein the pattern comprises a plurality of data types and a data size of the context data;

reading a context input pattern information from a memory device of the electronic device by the second integrated circuit; and triggering an application processor of the electronic device based on the context input pattern information by the second integrated circuit.

18. The method of claim 17, wherein the first integrated circuit includes a plurality of sensors, wherein the pattern of the context data varies depending on currently operating sensors from among the plurality of sensors, and wherein the plurality of sensors are configured to sense different types of environmental characteristics.

19. The method of claim 17, further comprising:

determining a dynamic voltage-frequency scaling (DVFS) level corresponding to the identified pattern based on the context input pattern information by the second integrated circuit; and generate a control signal corresponding to the DVFS level by the second integrated circuit.

20. The method of claim 19, further comprising:

generating at least one of a clock signal having a controlled frequency and a driving voltage having a controlled voltage level based on the control signal by a DVFS circuit of the electronic device;

receiving the at least one of the clock signal and the driving voltage from the DVFS circuit by the second integrated circuit; and processing the context data by using the at least one of clock signal and the driving voltage by the second integrated circuit.

* * * * *